(12) United States Patent
Kim et al.

(10) Patent No.: US 11,041,821 B2
(45) Date of Patent: Jun. 22, 2021

(54) ELECTRONIC DEVICE AND METHOD FOR SENSING MOISTURE IN AN ELECTRONIC DEVICE

(71) Applicant: Samsung Electronics Co., Ltd., Gyeonggi-do (KR)

(72) Inventors: Kyoung-Won Kim, Gyeonggi-do (KR); Sung-Eun Lee, Gyeonggi-do (KR); Jae-Hyun Ahn, Gyeonggi-do (KR); Je-Kook Kim, Gyeonggi-do (KR); Joon-Yung Park, Gyeonggi-do (KR); Kyung-Won Park, Gyeonggi-do (KR); Jong-Ik Won, Gyeonggi-do (KR); In-Geol Lee, Gyeonggi-do (KR); Yu-Dong Bae, Gyeonggi-do (KR); Dong-Rak Shin, Gyeonggi-do (KR); Kang-Jun Ko, Seoul (KR); Kyoung-Hoon Kim, Seoul (KR); Min-Gi Kim, Gyeonggi-do (KR); Sang-Il Park, Seoul (KR); Jeong-Hun Seo, Gyeonggi-do (KR)

(73) Assignee: Samsung Electronics Co., Ltd

( * ) Notice: Subject to any disclaimer, the term of this patent is extended or adjusted under 35 U.S.C. 154(b) by 337 days.

(21) Appl. No.: 15/938,704

(22) Filed: Mar. 28, 2018

(65) Prior Publication Data
US 2018/0284047 A1    Oct. 4, 2018

(30) Foreign Application Priority Data

Mar. 28, 2017 (KR) .................. 10-2017-0039523

(51) Int. Cl.
*G01N 27/04* (2006.01)
*H01R 13/52* (2006.01)
(Continued)

(52) U.S. Cl.
CPC ....... *G01N 27/048* (2013.01); *H01R 13/5202* (2013.01); *H02H 5/083* (2013.01); *H04M 1/72454* (2021.01); *H04M 1/0274* (2013.01)

(58) Field of Classification Search
CPC ......... H02H 5/083; H02H 5/00; G01N 27/048
(Continued)

(56) References Cited

U.S. PATENT DOCUMENTS

| 8,886,971 B2 * | 11/2014 | Chuang | .................... G06F 1/26 713/300 |
| 2004/0257037 A1 * | 12/2004 | Hartung | ................ H01M 10/46 320/114 |

(Continued)

FOREIGN PATENT DOCUMENTS

WO    WO-2016105505 A1 *    6/2016    ............. H04M 1/18

*Primary Examiner* — David L Singer
(74) *Attorney, Agent, or Firm* — The Farrell Law Firm, P.C.

(57) ABSTRACT

An electronic device and a method for sensing moisture in an electronic device are provided. The method for sensing moisture in an electronic device includes sensing moisture introduced into a connector of the electronic device in a state where one or more functions executable by connection of the connector with an external electronic device are activated. Further, the method includes deactivating the one or more functions based on the sensing; determining whether the introduced moisture is removed in a state where the one or more functions are deactivated; and activating the one or more functions if the moisture is removed.

20 Claims, 16 Drawing Sheets

(51) Int. Cl.
*H02H 5/08* (2006.01)
*H04M 1/72454* (2021.01)
*H04M 1/02* (2006.01)

(58) Field of Classification Search
USPC .................................. 340/604, 605
See application file for complete search history.

(56) References Cited

U.S. PATENT DOCUMENTS

| | | | | |
|---|---|---|---|---|
| 2006/0058069 A1* | 3/2006 | Garcia | ................ | H04B 1/3833 |
| | | | | 455/567 |
| 2011/0291668 A1* | 12/2011 | Mackey | ............ | H01R 13/6683 |
| | | | | 324/557 |
| 2012/0026018 A1* | 2/2012 | Lin | .................... | G06F 13/4068 |
| | | | | 341/26 |
| 2013/0182360 A1* | 7/2013 | Stevens | ................ | G06F 1/1656 |
| | | | | 361/71 |
| 2014/0130573 A1* | 5/2014 | Zielinski | ............. | G01N 27/048 |
| | | | | 73/29.03 |
| 2014/0191588 A1* | 7/2014 | Stevens | ................ | G06F 1/1632 |
| | | | | 307/125 |
| 2014/0191874 A1* | 7/2014 | Stevens | ................ | H03K 17/94 |
| | | | | 340/604 |
| 2014/0307356 A1* | 10/2014 | Hong | .................... | H02H 5/083 |
| | | | | 361/78 |
| 2014/0313039 A1* | 10/2014 | Stevens | ................ | H03K 17/94 |
| | | | | 340/604 |
| 2015/0180221 A1* | 6/2015 | Leinonen | ................ | H02H 5/04 |
| | | | | 361/103 |
| 2015/0303680 A1* | 10/2015 | Stevens | ................ | H02H 5/083 |
| | | | | 361/78 |
| 2016/0019773 A1* | 1/2016 | Stevens | ................ | H02H 5/083 |
| | | | | 340/604 |
| 2016/0233606 A1 | 8/2016 | Zhao | | |
| 2016/0313270 A1* | 10/2016 | Connell | ................ | G01R 31/69 |
| 2017/0271897 A1* | 9/2017 | Wen | ...................... | H02J 7/0029 |
| 2017/0288451 A1* | 10/2017 | Trusty | .................... | H04M 1/18 |
| 2017/0358922 A1* | 12/2017 | Bacon | ................ | H01R 13/6683 |

* cited by examiner

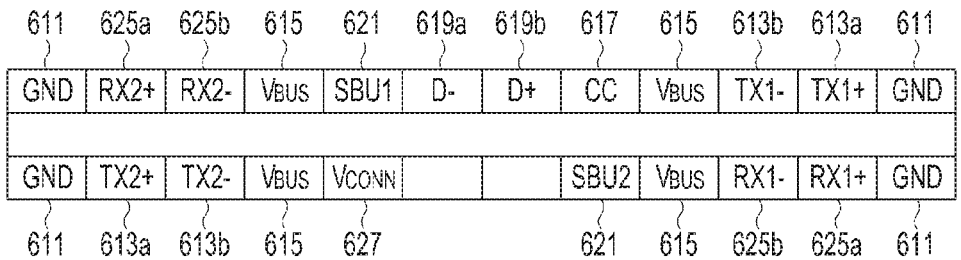

| | PIN No. | Signal Name | COMPARISON |
|---|---|---|---|
| 611 — | 1 | GND | GROUND |
| 613a — | 2 | TX+ | Super speed TX positive |
| 613b — | 3 | TX- | Super speed TX negative |
| 615 — | 4 | $V_{BUS}$ | USB CABLE CHARGING POWER |
| 617 — | 5 | CC | IDENTIFICATION TERMINAL |
| 619a — | 6 | D+ | + line of the differential bi-directional USB signal |
| 619b — | 7 | D- | - line of the differential bi-directional USB signal |
| 621 — | 8 | SBU | Side Band Use : additional purpose pin (ex: Audio signal, display signal, ETC.) |
| 615 — | 9 | $V_{BUS}$ | USB CABLE CHARGING POWER |
| 625a — | 10 | RX- | Super speed RX negative |
| 625b — | 11 | RX+ | Super speed RX positive |
| 611 — | 12 | GND | GROUND |

FIG.6D

ELECTRONIC DEVICE AND METHOD FOR SENSING MOISTURE IN AN ELECTRONIC DEVICE

PRIORITY

This application is based on and claims priority under 35 U.S.C. § 119 to Korean Patent Application No. 10-2017-0039523, filed on Mar. 28, 2017, in the Korean Intellectual Property Office, the disclosure of which is incorporated by reference herein in its entirety.

BACKGROUND

1. Field

The present disclosure relates generally to an electronic device for sensing moisture in a connector of the electronic device and a method for sensing moisture in the electronic device.

2. Description of Related Art

The progress in information and communication technologies, semiconductor technologies, etc. has increased the spread and use of various electronic devices. In particular, recent electronic devices have a waterproof function to allow the electronic device to continue to operate even when dropped in water.

While sensing moisture in an electronic device, the electronic device may be corroded due to the use of electric current for detecting the insertion of an external electronic device. Moreover, while sensing moisture in the electronic device, as the external electronic device is connected, moisture introduced into the connector moves back, causing sensing error information indicating that the moisture dries. Furthermore, when the electronic device is powered off, the moisture is not sensed, therefore the electronic device may be corroded by the use of electric current when an external electronic device for charging is inserted during the power-off state of the electronic device.

SUMMARY

Various embodiments provide an electronic device and a method for sensing moisture in the electronic device to prevent the electronic device from being corroded due to the use of electric current in a state where moisture is sensed in the electronic device.

Various embodiments provide an electronic device and a method for sensing moisture in the electronic device in a power-off state of the electronic device.

Various embodiments provide an electronic device and a method for sensing moisture in the electronic device to rapidly recognize whether an external material inserted into the electronic device is an external electronic device and to perform a corresponding function with the external electronic device.

In accordance with an aspect of the present disclosure, an electronic device includes a display; a connector; and a processor configured to sense moisture introduced into the connector in a state where one or more functions executable by connection of the connector with an external electronic device are activated; deactivate the one or more functions based on the sensing; determine whether the introduced moisture is removed in a state where the one or more functions are deactivated; and activate the one or more functions if the moisture is removed.

In accordance with an aspect of the present disclosure, an electronic device includes a display; a connector; and a processor configured to switch to a second state where a function of the connector is deactivated if sensing moisture in the connector in a first state where the function of the connector is activated, and to supply electric current to a first pin for sensing moisture drying in the second state.

In accordance with an aspect of the present disclosure, a method for sensing moisture in an electronic device includes sensing moisture introduced into a connector of the electronic device in a state where one or more functions executable by connection of the connector with an external electronic device are activated; deactivating the one or more functions based on the sensing; determining whether the introduced moisture is removed in a state where the one or more functions are deactivated; and activating the one or more functions if the moisture is removed.

In accordance with an aspect of the present disclosure, a method for sensing moisture in an electronic device includes switching from a first state where a function of a connector of the electronic device is activated to a second state where the function of the connector is deactivated, if sensing moisture in the connector; and supplying electric current to a first pin for sensing drying of moisture in the second state.

BRIEF DESCRIPTION OF THE DRAWINGS

The above and other aspects, features, and advantages of embodiments of the present disclosure will be more apparent from the following description taken in conjunction with the accompanying drawings, in which:

FIG. 6D is a diagram illustrating a structure of a connector of an electronic device, according to an embodiment;

DETAILED DESCRIPTION

Figure 1:
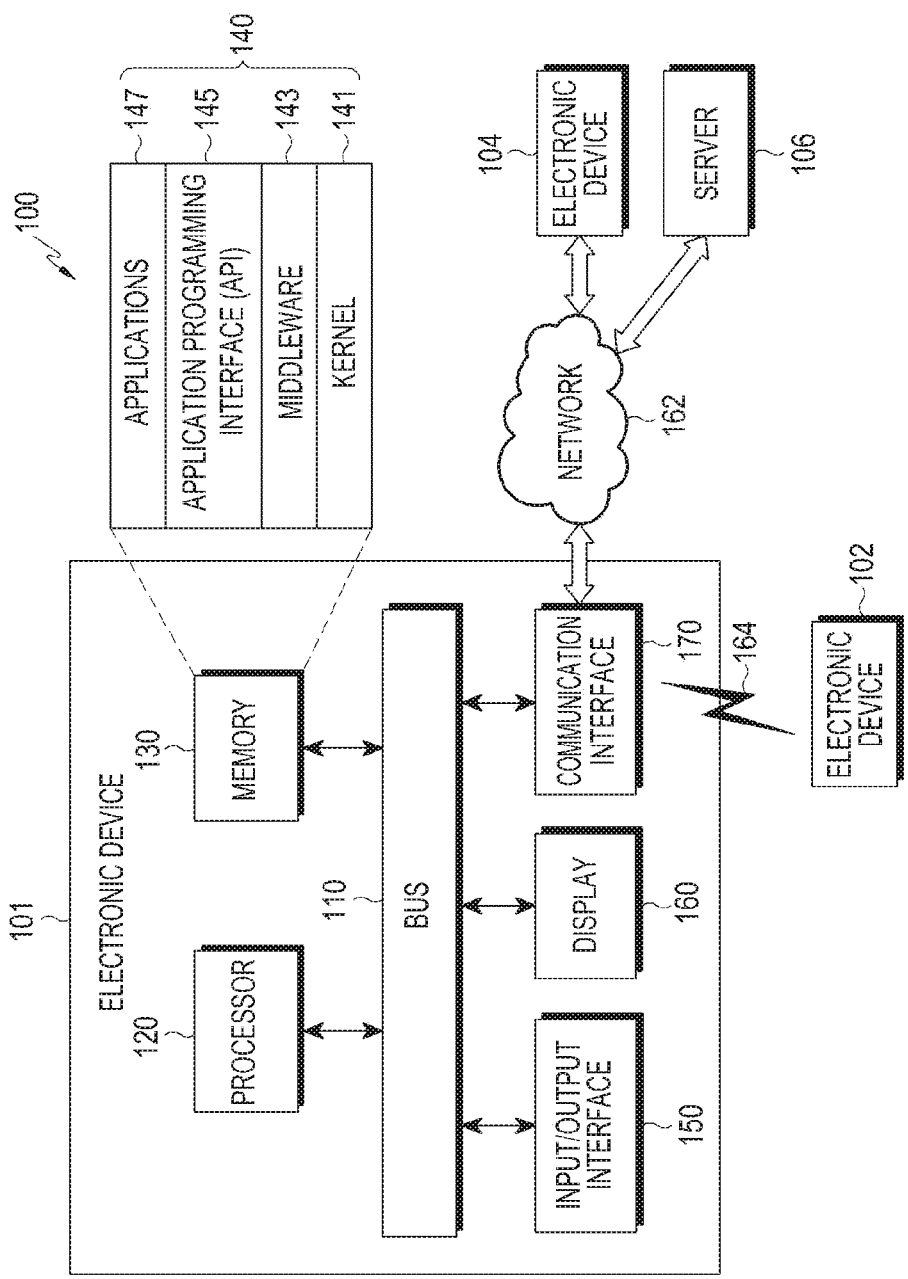
FIG. 1 is a block diagram illustrating an electronic device in a network environment, according to an embodiment.

Embodiments and terms used in the present disclosure do not limit the present disclosure to particular embodiments, and are construed as including various modifications, equivalents, and/or alternatives according to the embodiment.

An expression "configured to (or set)" used in the present disclosure may be used interchangeably with the expressions "suitable for", "having the capacity to", "adapted to", "made to", "capable of", or "designed to" according to the situation. Alternatively, in some situations, an expression "apparatus configured to" may mean that the apparatus "can" operate together with another apparatus or component. For example, the phrase "a processor configured (or set) to perform A, B, and C" may be a dedicated processor (e.g., an embedded processor) for performing a corresponding operation or a generic-purpose processor (e.g., a central processing unit (CPU) or an application processor (AP)) that can perform a corresponding operation by executing at least one software program stored in a memory device.

An electronic device according to an embodiment may include a smartphone, a tablet personal computer (PC), a mobile phone, a video phone, an electronic-book (e-book) reader, a desktop PC, a laptop PC, a netbook computer, a workstation, a server, a personal digital assistant (PDA), a portable multimedia player (PMP), a motion picture experts group (MPEG-1 or MPEG-2) audio layer 3 (MP3) player, a mobile medical equipment, a camera, and a wearable device. The wearable device may include an accessory type (e.g., a watch, a ring, a bracelet, an anklet, a necklace, glasses, contact lenses, a head-mounted device (HMD), etc.), a fabric or cloth-integrated type (e.g., electronic clothing, etc.), a body-attached type (e.g., a skin pad, a tattoo, etc.), a body implanted type (e.g., an implantable circuit, etc.), etc. The electronic device may include a television (TV), a digital versatile disk (DVD) player, audio equipment, a refrigerator, an air conditioner, a vacuum cleaner, an oven, a microwave oven, a laundry machine, an air cleaner, a set-top box, a home automation control panel, a security control panel, a TV box (e.g., Samsung HomeSync™, Apple TV™, or Google TV™), a game console, an electronic dictionary, an electronic key, a camcorder, and an electronic frame.

According to an embodiment, the electronic device may include various medical devices (e.g., a magnetic resonance angiography (MRA) device, a magnetic resonance imaging (MRI) device, a computed tomography (CT) device, an imaging device, or an ultrasonic device), a navigation system, a global positioning system (GPS) receiver, an event data recorder (EDR), a flight data recorder (FDR), a vehicle infotainment device, electronic equipment for ships (e.g., a navigation system and gyro compass), avionics, a security device, a vehicle head unit, an industrial or home robot, an automatic teller machine (ATM), a point of sales (POS) device, and an Internet of things (IoT) device (e.g., light bulbs, various sensors, electricity or gas meters, sprinkler devices, fire alarm devices, thermostats, streetlights, toasters, exercise machines, hot-water tanks, heaters, boilers, etc.).

According to an embodiment, the electronic device may include a part of a furniture or building/structure, a part of a vehicle, an electronic board, an electronic signature receiving device, a projector, and various measuring instruments (e.g., a water meter, an electricity meter, a gas meter, an electric wave meter, etc.).

According to an embodiment, the electronic device may be flexible or may be a combination of two or more of the above-described devices. The electronic device is not limited to the aforementioned devices. Herein, the term "user" used in the present disclosure may refer to a person who uses the electronic device or may refer to a device (e.g., an artificial intelligence (AI) electronic device) that use the electronic device.

The electronic device according to an embodiment may be one of various types of electronic devices. The electronic devices may include, for example, a portable communication device (e.g., a smart phone), a computer device, a portable multimedia device, a portable medical device, a camera, a wearable device, or a home appliance. The electronic devices are not limited to those described above.

It should be appreciated that various embodiments and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include all possible combinations of the items enumerated together in a corresponding one of the phrases. As used herein, such terms as "1st" and "2nd", or "first" and "second" may be used to simply distinguish a corresponding component from another, and do not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., by wire), wirelessly, or via a third element.

As used herein, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application specific integrated circuit (ASIC).

Various embodiments as set forth herein may be implemented as software (e.g., a program 140) including one or more instructions that are stored in a storage medium (e.g., internal memory or external memory) that is readable by a machine (e.g., an electronic device 101). For example, a processor (e.g., processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include code generated by a complier or code executable by an interpreter. The machine-readable storage medium may be provided in the form of a non-transitory storage medium. While, the term "non-transitory" simply means that the storage medium is a tangible device, and does not include a signal (e.g., an electromagnetic wave), this term does not differentiate between where data is semi-permanently stored in the storage medium and where the data is temporarily stored in the storage medium.

According to an embodiment, a method may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to an embodiment, each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

FIG. 1 is a block diagram illustrating an electronic device 101 in a network environment 100, according to an embodiment.

Referring to FIG. 1, an electronic device 101 in a network environment 100 may communicate with an electronic device 102 via a first network 162 (e.g., a short-range wireless communication network), or an electronic device 104 or a server 106 via a second network 164 (e.g., a long-range wireless communication network). The electronic device 101 may communicate with the electronic device 104 via the server 106. The electronic device 101 may include a bus 110, a processor 120, a memory 130, an input/output (I/O) interface 150, a display 160, and a communication interface 170. The electronic device 101 may omit at least one of the foregoing elements or may further include other elements.

The bus 110 may include a circuit for connecting, e.g., the elements 120 to 170 and delivering communication (e.g., a control message or data) between the elements 120 to 170. The processor 120 may include one or more of a CPU, an AP, and a communication processor (CP).

The processor 120 performs operations or data processing for control and/or communication with elements of the electronic device 101.

The processor 120 may execute, for example, software (e.g., a program 140) to control at least one other component (e.g., a hardware or software component) of the electronic device 101 coupled with the processor 120, and may perform various data processing or computation. According to an embodiment of the present disclosure, as at least part of the data processing or computation, the processor 120 may load a command or data received from another component (e.g., the input/output interface 150 or the communication interface 170) in volatile memory, process the command or the data stored in the volatile memory, and store resulting data in non-volatile memory. The processor 120 may include a main processor (e.g., a CPU or an AP), and an auxiliary processor (e.g., a graphics processing unit (GPU), an image signal processor (ISP), a sensor hub processor, or a CP) that is operable independently from, or in conjunction with, the main processor. Additionally or alternatively, the auxiliary processor may be adapted to consume less power than the main processor, or to be specific to a specified function. The auxiliary processor may be implemented as separate from, or as part of the main processor.

The auxiliary processor may control at least some of functions or states related to at least one component (e.g., the display 160, the input/output interface 150, or the communication interface 170) among the components of the electronic device 101, instead of the main processor while the main processor is in an inactive (e.g., sleep) state, or together with the main processor while the main processor is in an active state (e.g., executing an application). According to an embodiment, the auxiliary processor (e.g., an image signal processor or a communication processor) may be implemented as part of another component (e.g., the input/output interface 150 or the communication interface 170) functionally related to the auxiliary processor.

The memory 130 may store various data used by at least one component (e.g., the processor 120 or the input/output interface 150) of the electronic device 101. The various data may include, for example, software (e.g., the program 140) and input data or output data for a command related thereto. The memory 130 may include the volatile memory or the non-volatile memory.

The program 140 may be stored in the memory 130 as software, and may include, for example, an operating system (OS), a kernel 141, a middleware 143, application programming interface (API) 145, or an application 147.

At least some of the kernel 141, the middleware 143, and the API 145 may be referred to as an OS. The kernel 141 may control or manage system resources (e.g., the bus 110, the processor 120, the memory 130, etc.) used to execute operations or functions implemented in other programs (e.g., the middleware 143, the API 145, or the application 147). The kernel 141 provides an interface through which the middleware 143, the API 145, or the application 147 accesses separate components of the electronic device 101 to control or manage the system resources.

The middleware 143 may work as an intermediary for allowing the API 145 or the application 147 to exchange data in communication with the kernel 141. In addition, the middleware 143 may process one or more task requests received from the application 147 based on priorities. The middleware 143 may give a priority for using a system resource (e.g., the bus 110, the processor 120, the memory 130, etc.) of the electronic device 101 to at least one of the applications 147, and may process the one or more task requests.

The API 145 may be an interface used for the application 147 to control a function provided by the kernel 141 or the middleware 143, and may include at least one interface or function (e.g., an instruction) for file control, window control, image processing, or character control.

The I/O interface 150 may receive a command or data to be used by another component (e.g., the processor 120) of the electronic device 101, from the outside (e.g., a user) of the electronic device 101. The input/output interface 150 may include, for example, a microphone, a mouse, or a keyboard.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment of the present disclosure, the display device 160 may include touch circuitry adapted to detect a touch, or sensor circuitry (e.g., a pressure sensor) adapted to measure the intensity of force incurred by the touch. The display 160 may include a liquid crystal display (LCD), a light emitting diode (LED) display, an organic light emitting diode (OLED) display, a micro electro mechanical system (MEMS) display, or an electronic paper display. The display 160 may, display various content (e.g., a text, an image, a video, an icon, and/or a symbol, etc.) to users. The display 160 may include a touch screen, and receive a touch, a gesture, or a proximity or a hovering input by using an electronic pen or a part of a body of a user.

The communication interface 170 may support one or more specified protocols to be used for the electronic device 101 to be coupled with the external electronic device (e.g., the electronic device 102) directly (e.g., by wire) or wirelessly. According to an embodiment, the communication interface 170 may include, for example, a high definition multimedia interface (HDMI), a universal serial bus (USB) interface, a secure digital (SD) card interface, or an audio interface. The wireless communication may include cellular communication using long term evolution (LTE), LTE-advanced (LTE-A), code division multiple access (CDMA), wideband CDMA (WCDMA), a universal mobile telecommunication system (UMTS), wireless broadband (WiBro), or global system for mobile communications (GSM)). According to an embodiment of the present disclosure, the wireless communication may include wireless fidelity (Wi-Fi), Bluetooth™, Bluetooth low energy (BLE), Zigbee, near field communication (NFC), magnetic secure transmission (MST), radio frequency (RF), and a body area network (BAN), as illustrated as the second network 164. The wireless communication may include GNSS. The GNSS may be a GPS, a global navigation satellite system (Glonass), a Beidou navigation satellite system (Beidou), or Galileo, the European global satellite-based navigation system. Hereinbelow, the term "GPS" may be used interchangeably with the term "GNSS". The wired communication may include USB, HDMI, recommended standard-232 (RS-232), power line communication, and plain old telephone service (POTS). The network 162 may include a telecommunications network, for example, at least one of a computer network (e.g., a local area network (LAN) or a wide area network (WAN)), Internet, and a telephone network.

Each of the external electronic device 102 and the external electronic device 104 may be a device of the same type as or a different type than the electronic device 101. According to an embodiment, some or all of operations performed by the electronic device 101 may be performed in another electronic device or a plurality of electronic devices (e.g., the electronic device 102 or 104, or the server 106). When the electronic device 101 has to perform a function or a service automatically or at a request, the electronic device 101 may request another device to perform at least some functions associated with the function or the service instead of or in addition to executing the function or the service. The other electronic device may execute the requested function or additional function and deliver the execution result to the electronic device 101. The electronic device 101 may then process or further process the received result to provide the requested function or service. For this purpose, cloud computing, distributed computing, or client-server computing may be used.

Figure 2:
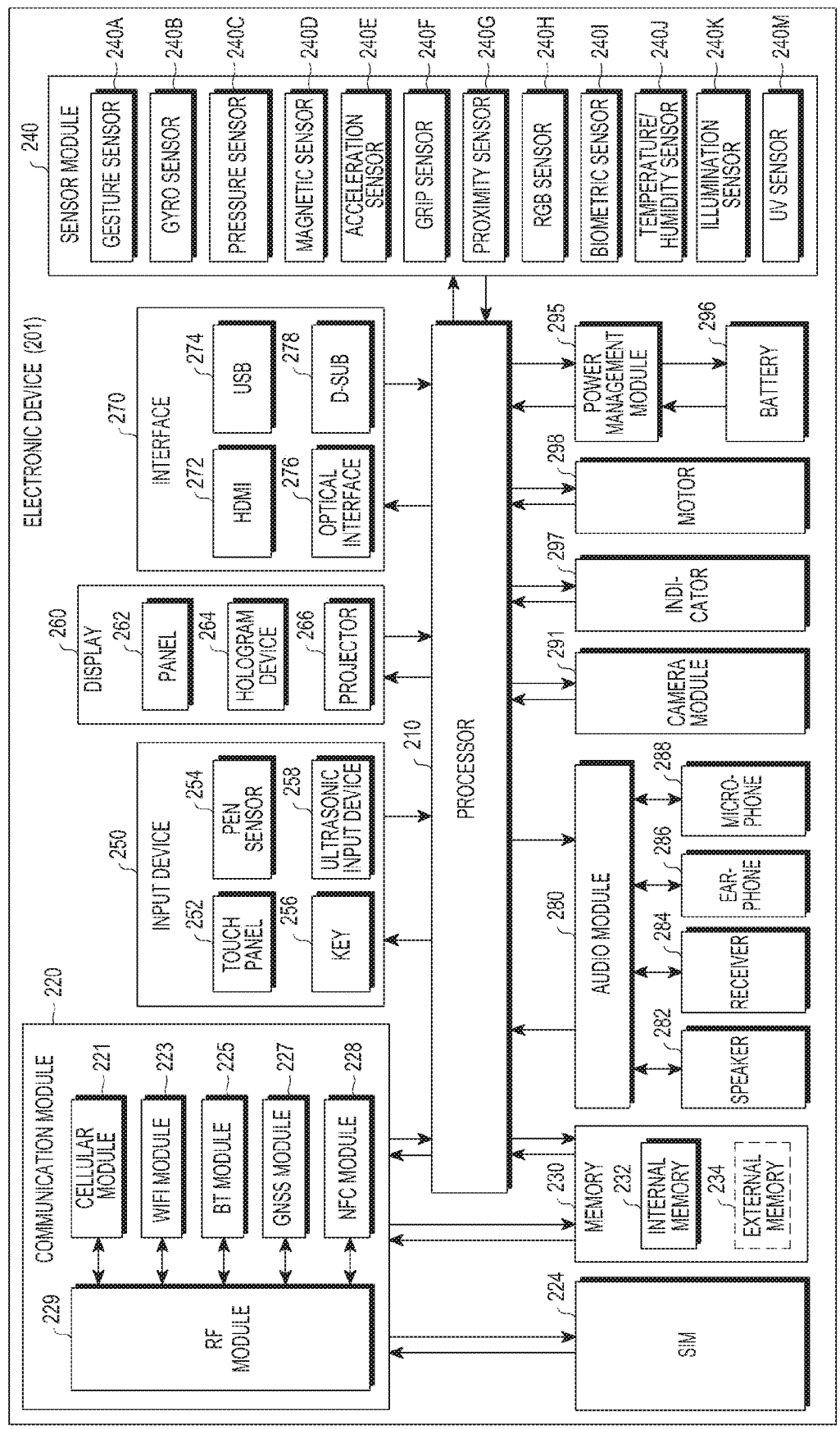
FIG. 2 is a block diagram of an electronic device, according to an embodiment.

FIG. 2 is a block diagram of an electronic device, according to an embodiment. The electronic device 201 may form the entire electronic device 101 or a part of the electronic device 101. The electronic device 201 may include one or more processors 210 (e.g., APs), a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298. The processor 210 controls multiple hardware or software components connected to the processor 210 by driving an OS or an application program, and performs processing and operations with respect to various data. The processor 210 may be implemented as, a system on chip (SoC). According to an embodiment of the present disclosure, the server 210 may include a GPU and/or an ISP. The processor 210 may include at least some of the electronic device 201 (e.g., a cellular module 221). The processor 210 loads an instruction or data received from at least one of other elements (e.g., a non-volatile memory) into a volatile memory to process the instruction or data, and stores result data in the non-volatile memory.

The communication module 220 may have a configuration that is the same as or similar to the communication interface 170. The communication module 220 may include the cellular module 221, a Wi-Fi module 223, a Bluetooth (BT) module 225, a GNSS module 227, an NFC module 228, and a radio frequency (RF) module 229. The cellular module 221 may provide a voice call, a video call, a text service, or an Internet service over a communication network. According to an embodiment, the cellular module 221 identifies and authenticates the electronic device 201 in a communication network by using the SIM 224 (e.g., a SIM card). The cellular module 221 may perform a portion of the functions that may be provided by the processor 210. The cellular module 221 may include a CP. At least some (e.g., two or more) of the cellular module 221, the Wi-Fi module 223, the BT module 225, the GNSS module 227, and the NFC module 228 may be included in one integrated circuit (IC) chip or IC package.

The RF module 229 may transmit and receive a communication signal (e.g., an RF signal). The RF module 229 may include a transceiver, a power amp module (PAM), a frequency filter, a low noise amplifier (LNA), or an antenna. According to an embodiment, at least one of the cellular module 221, the Wi-Fi module 223, the BT module 225, the GNSS module 227, and the NFC module 228 may transmit and receive an RF signal through the separate RF module.

The SIM 224 may include a card including an SIM or an embedded SIM, and may include unique identification information (e.g., an integrated circuit card identifier (ICCID) or subscriber information (e.g., an international mobile subscriber identity (IMSI)).

The memory 230 may include an internal memory 232 and/or an external memory 234. The internal memory 232 may include at least one of a volatile memory (e.g., dynamic random-access memory (DRAM), static RAM (SRAM), synchronous dynamic RAM (SDRAM), etc.), and a non-volatile memory (e.g., one time programmable read only memory (OTPROM), programmable ROM (PROM), erasable and programmable ROM (EPROM), electrically erasable and programmable ROM (EEPROM), etc.), mask ROM, flash ROM, a flash memory, and a solid-state drive (SSD). The external memory 234 may further include a flash drive, for example, a compact flash (CF), an SD, a micro secure digital (micro-SD), a mini secure digital (mini-SD), an extreme Digital (xD), a multi-media card (MMC), or a memory stick. The external memory 234 may be functionally or physically connected with the electronic device 201 through various interfaces.

The sensor module 240 measures physical quantity or senses an operation state of the electronic device 201 to convert the measured or sensed information into an electric signal. The sensor module 240 may include at least one of a gesture sensor 240A, a gyro sensor 240B, a pressure sensor 240C, a magnetic sensor 240D, an acceleration sensor 240E, a grip sensor 240F, a proximity sensor 240G, a color sensor 240H (e.g., red, green, blue (RGB) sensor), a biometric sensor 240I, a temperature/humidity sensor 240J, an illumination sensor 240K, and a ultraviolet (UV) sensor 240M. Additionally or alternatively, the sensor module 240 may include an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling at least one sensor included therein. According to an embodiment, the electronic device 201 may include a processor configured to control the sensor module 240 as part of or separately from the processor 210, to control the sensor module 240 during a sleep state of the processor 210.

The input device 250 may include, a touch panel 252, a (digital) pen sensor 254, a key 256, or an ultrasonic input device 258. The touch panel 252 may use at least one of a capacitive type, a resistive type, an IR type, and an ultrasonic type. The touch panel 252 may further include a control circuit. The touch panel 252 may further include a tactile layer to provide a tactile reaction to the user. The (digital) pen sensor 254 may include a recognition sheet which is a part of the touch panel 252 or a separate recognition sheet. The key 256 may also include a physical button, an optical key, or a keypad. The ultrasonic input device 258 senses ultrasonic waves generated by an input means through a microphone 288 and checks data corresponding to the sensed ultrasonic waves.

The display 260 may include a panel 262, a hologram device 264, a projector 266, and/or a control circuit for controlling them. The panel 262 may be implemented to be flexible, transparent, or wearable. The panel 262 may be configured with the touch panel 252 integrated into a single module. According to an embodiment, the panel 262 may include a pressure sensor (or a force sensor) capable of measuring a strength of a pressure by a user's touch. The pressure sensor may be integrated with the touch panel 252, or may be implemented as one or more sensors separate from the touch panel 252. The hologram device 264 shows a stereoscopic image in the air by using interference of light. The projector 266 displays an image onto an external screen through projection of light. The screen may be positioned inside or outside the electronic device 201.

According to an embodiment, the interface 270 may include an HDMI 272, a USB 274, an optical interface 276, or a D-subminiature (D-sub) 278. The interface 270 may be included in the communication interface 170. Additionally or alternatively, the interface 270 may include, for example, a mobile high-definition link (MHL) interface, an SD card/MMC interface, or an Infrared Data Association (IrDA) standard interface.

The audio module 280 bi-directionally converts sound and an electric signal. At least one element of the audio module 280 may be included in the I/O interface 150. The audio module 280 processes sound information input or output through the speaker 282, the receiver 284, the earphone 286, or the microphone 288. The camera module 291 is a device capable of capturing a still image or a moving image, and according to an embodiment, may include one or more image sensors (e.g., a front sensor or a rear sensor), a lens, an ISP, or a flash (e.g., an LED, a xenon lamp, etc.).

The power management module 295 manages power of the electronic device 201. 25 According to an embodiment, the power management module 295 may include a power management integrated circuit (PMIC), a charger IC, or a battery gauge. The PMIC or the charger IC may have a wired and/or wireless charging scheme. The wireless charging scheme includes a magnetic-resonance type, a magnetic induction type, and an electromagnetic type, and for wireless charging, an additional circuit, for example, a coil loop, a resonance circuit, or a rectifier may be included. The battery gauge measures the remaining capacity of the battery 296 or the voltage, current, or temperature of the battery 296 during charging. The battery 296 may include a rechargeable battery and/or a solar battery.

The indicator 297 displays a particular state, for example, a booting state, a message state, or a charging state, of the electronic device 201 or a part thereof (e.g., the processor 210). The motor 298 converts an electric signal into mechanical vibration or generates vibration or a haptic effect. The electronic device 201 may include a device for supporting the mobile TV (e.g., a GPU) to process media data according to a standard such as digital multimedia broadcasting (DMB), digital video broadcasting (DVB), or mediaFlo™. Each of the foregoing elements described herein may be configured with one or more components, and the names of which may vary with a type of the electronic device. According to an embodiment, some components of the electronic device 201 may be omitted or may further include other elements, and some of the components may be coupled to form one entity and perform the same functions of the components before being coupled.

Figure 3:
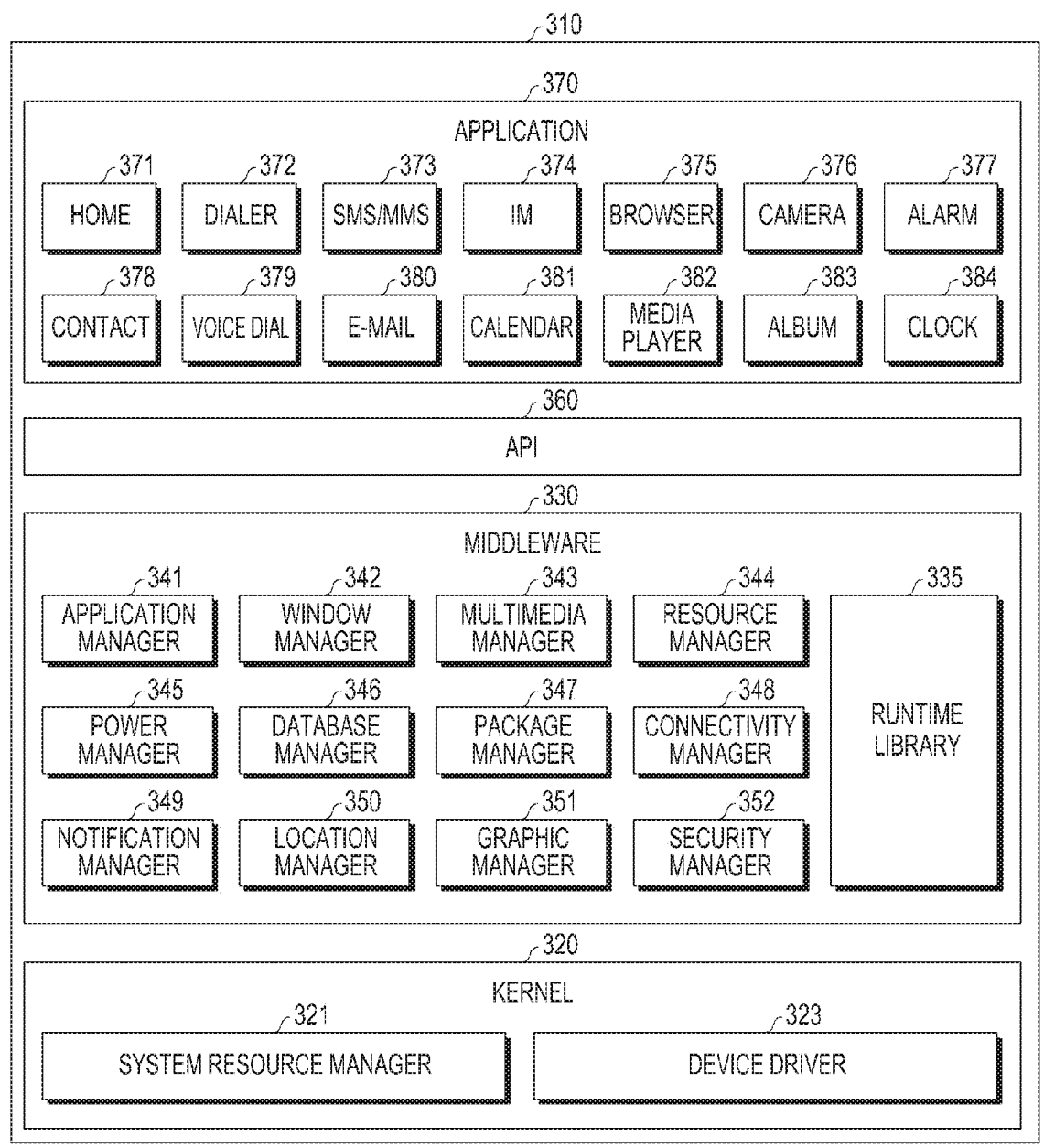
FIG. 3 is a block diagram of a programming module, according to an embodiment.

FIG. 3 is a block diagram of a programming module 310, according to an embodiment.

The programming module 310 may include an OS to control one of more resources associated with an electronic device 101, a middleware 330, an API 360, an application 370, or a kernel 320 executable on the OS. The OS may include Android™, iOS™, Windows™, Symbian™, Tizen™, or Bada™. At least part of the program module 310, for example, may be pre-loaded on the electronic device 101 during manufacture, or may be downloaded from or updated by an external electronic device (e.g., the electronic device 102 or 104, or the server 106) during use by a user.

The OS may control management (e.g., allocating or deallocation) of one or more system resources (e.g., process, memory, or power source) of the electronic device 101. The OS, additionally or alternatively, may include one or more driver programs to drive other hardware devices of the electronic device 101.

The kernel 320 may include a system resource manager 321 and/or a device driver 323. The system resource manager 321 may perform control, allocation, retrieval of system resources, etc. According to an embodiment, the system resource manager 321 may include a process management unit, a memory management unit, or a file system management unit. The device driver 323 may include a display driver, a camera driver, a BT driver, a shared memory driver, a USB driver, a keypad driver, a Wi-Fi driver, an audio driver, or an inter-process communication (IPC) driver.

The middleware 330 may provide a function that the application 370 needs in common or provide various functions to the application 370 through the API 360 to allow the application 370 to efficiently use limited system resources in an electronic device. According to an embodiment, the middleware 330 may include a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module that a compiler uses to add a new function through a programming language while the application 370 is executed. The runtime library 335 performs input/output management, memory management, or calculation function processing.

The application manager 341 manages a life cycle of the applications 370. The window manager 342 manages a GUI resource used on a screen. The multimedia manager 343 recognizes a format necessary for playing media files and performs encoding or decoding on a media file by using a codec appropriate for a corresponding format. The resource manager 344 manages source code or a memory space of the applications 370.

The power manager 345 manages a capacity, a temperature, or power of a battery, and determines or provides power information necessary for an operation of the electronic device using the corresponding information. According to an embodiment, the power manager 345 may operate with a basic input/output system (BIOS). The database manager 346 generates, searches, or changes a database used for the application 370. The package manager 347 manages the installation or update of an application distributed in a package file format.

The connectivity manager 348 manages a wireless connection. The notification manager 349 provides an event, e.g., an arriving message, an appointment, proximity notification, etc. The location manager 350 manages location information of the electronic device. The graphic manager 351 manages a graphic effect to be provided to a user or a user interface relating thereto. The security manager 352 provides system security or user authentication. According to an embodiment, the middleware 330 may further include a telephony manager for managing a voice or video call function of the electronic device or a middleware module forming a combination of functions of the above-described components.

According to an embodiment, the middleware 330 provides a module specified for each type of OS. Additionally, the middleware 330 may delete some of existing elements or add new elements dynamically. The API 360 may be provided as a set of API programming functions with a different configuration according to the type of OS. In the case of Android or iOS, one API set may be provided by each platform, and in the case of Tizen, two or more API sets may be provided.

The application 370 may include one or more applications capable of providing a function for a home application 371, a dialer application 372, a short messaging service/multimedia messaging service (SMS/MMS) application 373, an instant message (IM) application 374, a browser application 375, a camera application 376, an alarm application 377, a contact application 378, a voice dial application 379, an e-mail application 380, a calendar application 381, a media player application 382, an album application 383, a clock application 384, a healthcare application (e.g., an application for measuring an exercise amount, a blood sugar level, etc.), or an environment information providing application (e.g., an application for providing air pressure, humidity, temperature information, etc.).

The device management application may control the power (e.g., turn-on or turn-off) or the function (e.g., adjustment of brightness, resolution, or focus) of the external electronic device or some component thereof (e.g., a display device or a camera module of the external electronic device). The device management application, additionally or alternatively, may support installation, delete, or update of an application running on the external electronic device.

According to an embodiment, the application 370 may include an information exchange application supporting information exchange between the electronic device and an external electronic device. The information exchange application may include a notification relay application for transferring specific information to the external electronic device or a device management application for managing the external electronic device.

The notification relay application may deliver notification information generated in another application of the electronic device to an external electronic device or may receive notification information from the external electronic device and provide the notification information to the user.

The device management application may manage (e.g., install, remove, or update) a function (e.g., turn on/turn off of an external electronic device itself (or a part thereof) or control of brightness (or resolution) of a display) of an external device communicating with the electronic device, a service provided by an application operating in an external electronic device or provided by the external electronic device (e.g., a call service or a message service).

According to an embodiment, the application 370 may include an application (e.g., a healthcare application of mobile medical device) designated according to an attribute of the external electronic device. The application 370 may include an application received from the external electronic device.

At least a part of the programming module 310 may be implemented (e.g., executed) by software, firmware, hardware, or a combination of two or more of them, and may include modules, programs, routines, sets of instructions, or processes for performing one or more functions.

Figure 4:
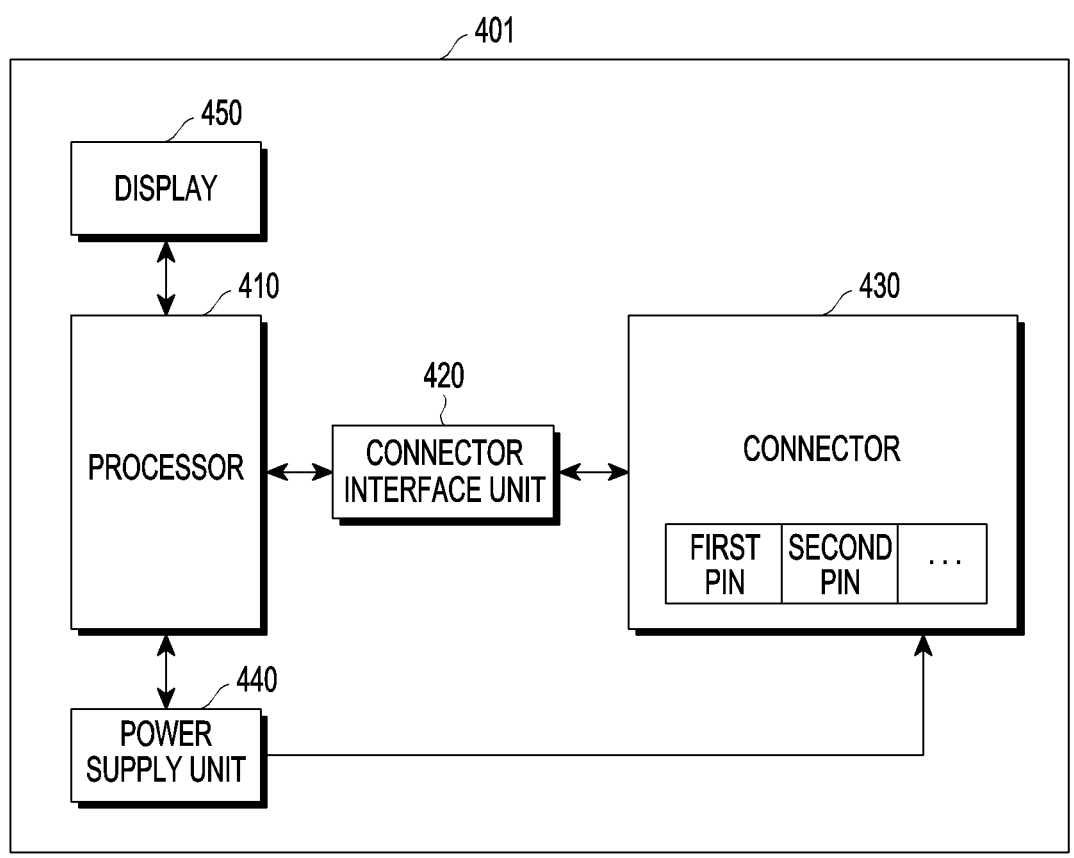
FIG. 4 is a block diagram of an electronic device for sensing moisture, according to an embodiment.

FIG. 4 is a block diagram of an electronic device for sensing moisture, according to an embodiment.

Referring to FIG. 4, an electronic device 401 may include a processor 410, a connector interface unit 420, a connector 430, a power supply unit 440, and a display 450.

According to an embodiment, the processor 410 senses moisture introduced in a connector 430 by using at least one pin (e.g., a second pin) included in the connector 430 in a first state where a function of the connector 430 is activated (e.g., one or more functions executable by connection with an external electronic device are activated). Once sensing moisture in the connector 430, the processor 410 switches to a second state where the function of the connector 430 is deactivated (e.g., the one or more functions executable in connection with the external electronic device are deactivated), and in the second state, supplies electric current to at least one pin (e.g., a first pin) which is included in the connector 430 and is capable of sensing moisture drying in which the moisture introduced into the connector 430 is removed.

Figure 5:
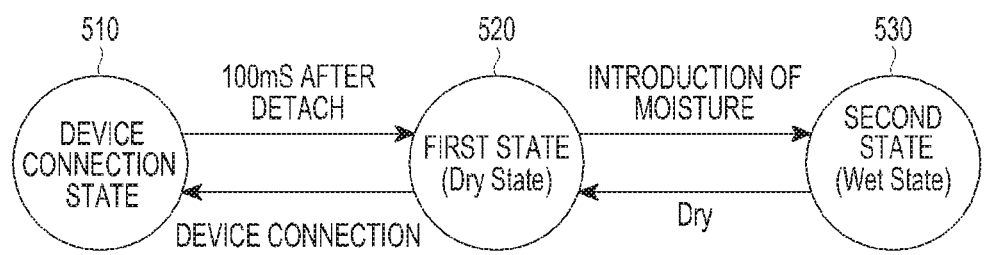
FIG. 5 is a diagram illustrating a state transition or switchover in an electronic device, according to an embodiment.

According to an embodiment, the electronic device may include the first state and the second state. The first state is a moisture-free state (or a dry state) where moisture is removed from the connector 430 such that electric current is provided to a plurality of pins of the connector 430 and the function of the connector 430 is activated. The second state is a moisture-sensed state where moisture introduced into the connector 430 is sensed, and in order to prevent corrosion of the electronic device 401, supply of electric current to the other pins of the plurality of pins of the connector 430 except for the first pin, which is for sensing moisture drying, is blocked and the function of the connector 430 is deactivated. FIG. 5 is a diagram illustrating a state transition or switchover in an electronic device, according to an embodiment.

Referring to FIG. 5, in a device connection state 510, an external electronic device (e.g., an external electronic device for charging) is inserted into the connector 430 of the electronic device 401, such that the electronic device performs a particular function (e.g., a charging function) with the external electronic device.

In a first state 520, insertion of the external electronic device into the connector 430 of the electronic device in the device connection state 510 is released and then a specific time of 100 ms elapses. Moisture in the connector 430 is not sensed, therefore one or more functions of the connector 430 executable by connection with the external electronic device are activated.

In a second state 530, moisture introduced into the connector 430 in the first state 520 is sensed, therefore one or more functions of the connector 430 executable by connection with the external electronic device are deactivated. Electric current is provided to the first pin for sensing moisture drying of the connector 430 and electric current to the other pins is blocked.

According to an embodiment, the processor 410 provides a small amount of electric current to the first pin to sense drying of moisture in the connector 430 at predetermined intervals in the second state of the electronic device.

According to an embodiment, the processor 410, while sensing drying of moisture in the connector 430 at predetermined intervals by the first pin, blocks supply of electric current in a first period where a dry state of the connector 430 is not sensed, and supplies electric current in a second period where the dry state of the connector 430 is sensed, thereby preventing corrosion of the connector 430.

According to an embodiment, the processor 410 repeats an on/off operation in the second period where the dry state of the connector 430 is sensed, and supplies electric current in case of the on operation to prevent corrosion of the connector 430.

Figure 6A:
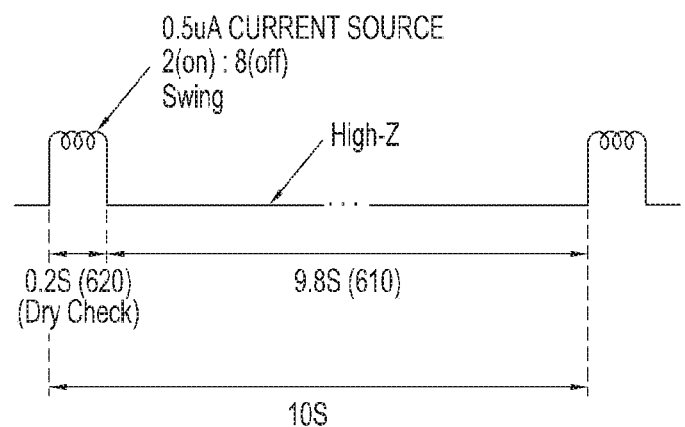
FIG. 6A is a diagram illustrating an operation of a first pin in a second state of an electronic device, according to an embodiment.

FIG. 6A is a diagram illustrating an operation of the first pin in the second state of the electronic device, according to an embodiment.

Referring to FIG. 6A, when an interval for sensing the dry state of the connector 430 is, for example, 10 seconds in the second state where the function of the connector of the electronic device is deactivated, the processor 410 may determine a first period 610 to be 9.8 seconds where the dry state of the connector is not sensed and a second period 620 to be 0.2 seconds where the dry state of the connector is sensed. The processor 410 sets the first pin to high impedance or to ground in the first period 610 so as not to be provided with electric current, and provides a small amount of electric current (e.g., 1.5 μA) to the first pin in the second period 620 to sense the dry state of the connector. The processor 410 may further reduce power consumption by repeating the on/off operation in the second period 620.

According to an embodiment, the processor 410 may determine the dry state of the connector 430 if measuring a high state value when setting the first pin to be high and measuring a low state value when setting the first pin to be low in the second period. The processor 410 may determine that the connector 430 is in a moist state (or wet state), if not measuring the high state value when setting the first pin to be high or not measuring the low state value when setting the first pin to be low, or if not measuring the high state value when setting the first pin to be high and not measuring the low state value when setting the first pin to be low, in the second period.

According to an embodiment, the processor 410 senses whether moisture is introduced into the connector through the second pin for sensing insertion of an external electronic device among the plurality of pins of the connector in the second state where the function of the connector of the electronic device is activated. The processor 410 determines whether the external electronic device is inserted into the electronic device or moisture is introduced into the electronic device, based on a detected voltage change through the second pin.

According to an embodiment, once the electronic device switches from the first state to the second state, the processor 410 blocks electric current provided to the other pins except for the first pin of the connector 430. The processor 410 includes a pull-down resistor connected to each of the plurality of pins to block electric current from flowing into the external electronic device.

Figure 6B:
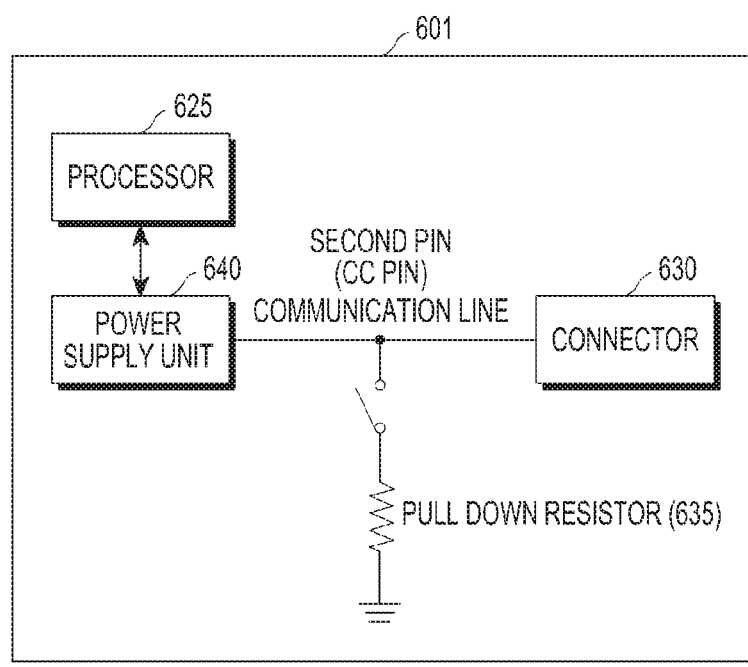
FIG. 6B is a diagram of an electronic device illustrating an operation of a second pin in a second state of the electronic device, according to an embodiment.

FIG. 6B is a diagram of the electronic device illustrating an operation of the second pin in the second state of the electronic device, according to an embodiment.

Referring to FIG. 6B, an electronic device 601 may include a processor 625, a connector 630, and a power supply unit 640.

According to an embodiment, in the second state where one or more functions executable by connection of the connector 630 with an external electronic device are deactivated, the processor 625 pulls down a communication line of the second pin (e.g., a configuration channel (CC) pin) with the pull down resistor 635 to block the electric current supply of the power supply unit 640 to the second pin through a communication line of the second pin.

Figure 6C:
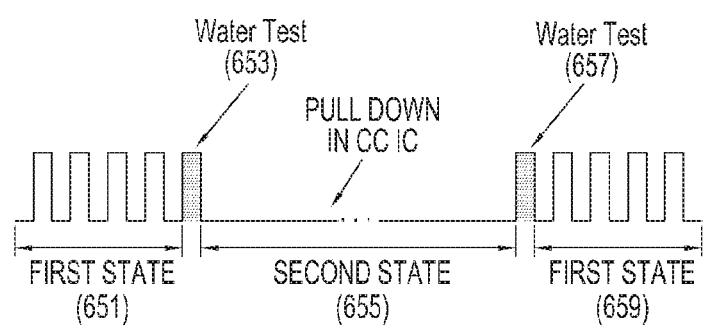
FIG. 6C is a diagram illustrating an operation of a second pin in a second state of an electronic device, according to an embodiment.

FIG. 6C is a diagram illustrating an operation of the second pin in the second state of the electronic device, according to an embodiment.

Referring to FIG. 6C, in a first state where the one or more functions executable by connection of the connector 630 with the external electronic device are activated as indicated by 651, if moisture is sensed by the second pin (e.g., a CC pin) as indicated by 653, the processor 625 switches to the second state where the one or more functions executable by connection of the connector 630 with the external electronic device are deactivated as indicated by 655.

The processor 625 pulls down the communication line of the second pin in the second state to block the supply of electric current to the second pin through the communication line of the second pin as indicated by 655. Once sensing the dry state where the moisture in the connector is removed by using the first pin (e.g., a side band use (SBU) pin) to which the electric current is provided in the second state as indicated by 657, the processor 625 switches to the first state where the function of the connector is activated as indicated by 659.

According to an embodiment, the processor 410 checks a wet state of the connector after the elapse of a predetermined time if sensing moisture drying in the connector in the second state where moisture is sensed in the connector 430 of the electronic device.

According to an embodiment of the present disclosure, the processor 410 temporarily supplies electric current to the second pin capable of sensing insertion of the external electronic device among the plurality of pins of the connector if sensing the dry state through the first pin in the second state, and detects through the second pin whether the external electronic device is inserted to the electronic device. The processor 410 checks the wet state based on a state value measured by the first pin or a voltage value received by the second pin after the elapse of a predetermined time, if sensing insertion of the external electronic device into the connector 430 in the second state. The processor 410 maintains the second state if sensing the wet state of the connector 430 based on a result of checking the wet state. The processor 410 switches to the first state if sensing the dry state of the connector 430 based on the result of checking the wet state.

According to an embodiment, if sensing the dry state in the second state, the processor 410 supplies electric current to the second pin (e.g., the CC pin) or a third pin (e.g., USB cable charging power ($V_{BUS}$) pin) capable of sensing insertion of the external electronic device among the plurality of pins of the connector, and displays charging alert information on the display 450 if sensing insertion of an external electronic device for charging based on a voltage value received from the second pin or the third pin. The processor 410 checks the wet state based on the state value measured by the first pin or the voltage value received by the second pin after the elapse of the predetermined time. The processor 410 maintains the first state if sensing the wet state of the connector 410, and blocks a charging function of the external electronic device. The processor 410 switches to the first state if sensing the dry state of the connector 430 based on the result of checking the wet state.

The processor 410 checks for the wet state based on the state value measured by the first pin or the voltage value received by the second pin, if insertion of the external electronic device for charging is released by a user based on the displaying of the charging alert information. The processor 410 maintains the second state if sensing the wet state of the connector 430. The processor 410 switches to the first state if sensing the dry state of the connector 430.

According to an embodiment, if sensing the second state information (e.g., a wet bit set to 1, or a dry bit set to 0) indicating sensing of moisture in the connector from the connector interface unit 420 in the first state, the processor 410 switches to the second state and controls the display 450 to display information indicating the wet state.

According to an embodiment, if receiving the third state information (e.g., a wet bit set to 0, or a dry bit set to 0) indicating an event occurs due to an external factor in the second state from the connector interface unit 420 in the second state, the processor 410 maintains the second state.

According to an embodiment, if receiving the third state information indicating an event occurs due to an external factor in the second state and information indicating insertion of an external electronic device for charging into the connector from the connector interface unit 420 in the second state, the processor 410 maintains the second state and controls the display 450 to display information indicating a charging alert.

According to an embodiment, if receiving the first state information (e.g., a wet bit set to 0, or a dry bit set to 1) from the connector interface unit 420 in the second state, the processor 410 switches to the first state and removes the displaying of the information indicating the charging alert.

According to various embodiments, if an external electronic device is inserted when the electronic device is in a power-off state, the processor 410 checks the wet state of the connector 430 into which the external electronic device is inserted through the first pin.

According to an embodiment, if the external electronic device for charging is inserted when the electronic device is in the power-off state, the electronic device 101 is powered on, and the processor 410 checks, using the first pin, for the wet state of the connector 430 into which the external electronic device for charging is inserted. If sensing moisture in the connector 430 based on a result of checking for the wet state, the processor 410 blocks charging with the external electronic device and displays information indicating a charging alert on the display 450.

According to an embodiment, if the external electronic device is inserted into the connector 430 when the electronic device is in the power-off state, the electronic device is powered on and the processor 410 supplies electric current to the second pin for sensing insertion of the external electronic device. If the external electronic device inserted into the electronic device for charging, which does not control the first pin, the processor 410 senses introduction of moisture in the connector 430 by using the first pin during execution of a charging function by the first external electronic device. If the external electronic device inserted into the electronic device is for charging, which does not control the first pin, the processor 410 senses introduction of moisture in the connector 430 by using the first pin during preparation for the charging function by the first external electronic device.

If the wet state of the connector 430 is sensed by the first pin when the first external electronic device for charging is inserted into the powered-off electronic device and the charging function is executed, then the processor 410 displays the information indicating the charging alert on the display 450 and the processor 410 blocks the charging function executed with the first external electronic device.

If the external electronic device inserted into the electronic device is a second external electronic device for charging, which controls the first pin, the processor 410 checks for the wet state of the connector 430 by using the first pin before performing communication (e.g., vendor defined message (VDM) communication) with the second pin. If receiving a VDM from the second external electronic device for charging, the processor 410 recognizes that the second external electronic device for charging is in a display port alternate (DP Alt mode), and controls the second external electronic device to control and use the first pin (e.g., an SBU pin), thereby checking for the wet state of the connector 430 by using the first pin before the first external electronic device for charging controls the first pin.

If sensing the moisture in the connector 430, the processor 410 displays the information indicating the charging alert and blocks the charging function to be executed with the second external electronic device. If not sensing the moisture in the connector 430, the processor 410 executes the charging function with the second external electronic device. The second external electronic device for charging may be a multi-port adaptor using the first pin while executing the charging function.

According to an embodiment, if powering off the electronic device is selected when the second external electronic device for charging is connected and the charging function is executed in the power-on state of the electronic device, then the processor 410 performs at least one of releasing the control by the first pin or resetting the second pin before the electronic device is powered off As the processor 410 performs at least one of releasing the control by the first pin or resetting the second pin before the electronic device is powered off, it is possible to prevent the first pin from erroneously sensing that the moisture is introduced into the connector 430 because the second external electronic device for charging connected to the electronic device in the power-off state controls the first pin.

By releasing the control of the first pin, the processor 410 prevents the external electronic device for charging connected to the electronic device in the power-off state from controlling the first pin. When recognizing the second external electronic device for charging connected to the electronic device in the power-off state by resetting the second pin, the processor 410 may recognize the power-off state of the electronic device connected to the external electronic device for charging as the insertion of the second external electronic device for charging.

According to an embodiment, the processor 410 may rapidly sense the external electronic device inserted into the connector 430 of the electronic device through the first pin.

According to an embodiment, if a foreign substance is detected in the connector 430 in the first state where the connector 430 is in the dry state, then the processor 410 detects the type of the foreign substance by using the first pin; if sensing that the type of the foreign substance is the external electronic device inserted into the connector 430, the processor 410 is connected to the external electronic device to execute a corresponding function without checking for the wet state through the second pin.

According to an embodiment, the processor 410 detects the type of the foreign substance by using the first pin if detecting the foreign substance in the first state; if sensing that the type of the foreign substance is not the external electronic device connected to the connector 430, the processor 410 detects the type of the foreign substance by using the second pin. If sensing by using the second pin that the type of the foreign substance is the external electronic device inserted into the connector 430, then the processor 410 is connected to the external electronic device and executes a corresponding function. If sensing by using the second pin that the type of the foreign substance is not the external electronic device inserted into the connector 430, the processor 410 checks for the wet state of the connector 430 and switches to the second state where the connector 430 is in the wet state.

According to an embodiment, the first pin may determine the type of the foreign substance detected in the connector 430 at a higher recognition speed than the second pin.

According to an embodiment, the second pin may determine the type of the foreign substance detected in the connector 430 with a more accurate recognition rate.

According to an embodiment, the processor 410 may determine the insertion of the external electronic device into the connector 430 if measuring a high state value when setting the first pin to be high and measuring a low state value when setting the first pin to be low, and may be rapidly connected to the external electronic device inserted into the connector 430 and perform a corresponding function.

According to an embodiment, the processor 410 may not sense the insertion of the external electronic device into the connector 430 and may determine the type of a foreign substance detected in the connector 430 by using the first pin, if not measuring the high state value when setting the first pin to be high or not measuring the low state value when setting the first pin to be low, or if not measuring the high state value when setting the first pin to be high and not measuring the low state value when setting the first pin to be low.

According to an embodiment, the processor 410 determines whether the type of the foreign substance is an external electronic device or moisture introduced into the connector based on a voltage change in the second pin, if sensing that the type of the foreign substance detected in the connector 430 using the first pin is not the external electronic device.

According to an embodiment, the connector interface unit 420 performs an interface function between the processor 410 and the connector 430.

According to an embodiment, the connector interface unit 420 is connected to the external electronic device through a voltage received from pins of the connector 430 to perform a corresponding function.

According to an embodiment, the connector interface unit 420 senses the wet state or the dry state of the connector 430 by using a state value measured from the first pin among the plurality of pins of the connector 430 or a voltage value received from the second pin among the plurality of pins of the connector 430, and transmits information indicating the wet state of the connector 430 or information indicating the dry state of the connector 430 to the processor 410.

According to an embodiment, the connector interface unit 420 transmits the second state information to the processor 410, if sensing the introduction of moisture in the connector 430 according to the voltage change received from the second pin in the first state.

According to an embodiment, the connector interface unit 420 transmits the first state information indicating the dry state of the connector 430 to the processor 410, if measuring the high state value when setting the first pin to be high or measuring the low state value when setting the first pin to be low, while in the second state.

According to an embodiment, the connector interface unit 420 transmits the third state information for maintaining the second state to the processor 410, if sensing the dry state because of an occurrence of an event (e.g., insertion of the external electronic device) due to an external factor while in the second state. If detecting an external electronic device having a third pin (e.g., a $V_{BUS}$ pin) for supplying power to the connector 430, the connector interface unit 420 transmits information indicating insertion of the external electronic device for charging to the processor 410.

According to an embodiment, the connector interface unit 420 transmits the information indicating insertion of the external electronic device for charging to the processor 410 according to the voltage change in the second pin when the electronic device is in the power-off state.

According to an embodiment, the connector interface unit 420 transmits the second state information indicating the wet state or the first state information indicating the dry state to the processor 410 according to a high state value or a low state value measured from the first pin based on a setting state, when the external electronic device for charging is connected to the powered-off electronic device and the processor 410 executes the charging function.

According to an embodiment, the connector interface unit 420 rapidly senses that the type of a foreign substance detected in the connector 430 is an external electronic device by using the high state value or the low state value measured from the first pin based on the setting state, and transmits information indicating insertion of the external electronic device the processor 410. If sensing through the first pin that the type of the foreign substance is not the external electronic device inserted to the connector, the connector interface unit 420 determines whether the type of the foreign substance is the external electronic device inserted to the connector 430 or the moisture introduced into the connector 430 based on the voltage change in the second pin.

According to an embodiment, the connector interface unit 420 may be included in the processor 410.

According to an embodiment, the connector 430 may include a plurality of pins into which the external electronic device is inserted to perform communication between the electronic device and the external electronic device or to perform a corresponding function, and the plurality of pins may include the first pin for sensing the dry state in the second state where the connector is in the wet state and the second pin for sensing insertion of the external electronic device and the wet state of the connector in the first state where the connector is in the dry state.

According to an embodiment, the first pin may be used to check the dry state of the connector 430 in the second state at predetermined intervals.

According to an embodiment, the first pin may be used to check for the wet state of the connector 430 when the electronic device is in the power-off state.

According to an embodiment, the first pin may be used to rapidly recognize whether the type of the foreign substance detected in the connector when the electronic device in the power-on state is the external electronic device.

According to an embodiment, the first pin may be an extra pin among the pins of the connector 430, and may be set and used for various purposes depending to the electronic device or the type of the external electronic device inserted into the electronic device. For example, if the connector of the electronic device is a USB type-C, the first pin may be an SBU pin.

According to an embodiment, the second pin may be used to sense insertion of the external electronic device and to sense the wet state of the connector in the first state.

According to an embodiment, if the type of the foreign substance detected in the connector through the first pin when the electronic device in the power-on state is not sensed as the external electronic device, the second pin may be used to sense whether the type of the foreign substance detected in the connector is the external electronic device or moisture introduced into the connector.

According to an embodiment, if the connector of the electronic device is the USB type-C, the second pin may be a CC pin. FIG. 6D is a diagram illustrating a structure of a connector of an electronic device, according to an embodiment. FIG. 6D shows a structure of the USB type-C connector.

Referring to FIG. 6D, the connector 630 may include ground (GND) pins 611, super speed TX (TX)+/TX− pins 613a and 613b, $V_{BUS}$ pins 615, a CC pin 617, differential bi-directional USB signal (D)+/D− pins 619a and 619b, an SBU pin 621, super speed RX (RX)+/RX− pins 625a and 625b, and ground (GND) pins 611.

The TX+/TX− pins 613a and 613b are pins for a super-speed data bus capable of performing rapid transmission, the $V_{BUS}$ pins 615 are pins for USB cable charging power, and the CC pin 617 is an identification terminal. The D+/D− pins 619a and 619b are pins for differential bi-directional USB signals, the SBU pin 621 is an extra pin available for various purposes (e.g., an audio signal, a display signal, etc.), the RX+/RX− pins 625a and 625b are pins for a super-speed data bus capable of performing rapid reception, and the $V_{CONN}$ pin 627 is a pin for supporting plug power.

The SBU pin 621 may be used as a first pin for sensing the dry state where the moisture introduced into the connector is removed in the second state where one or more functions executable by connection with the external electronic device are deactivated, or sensing introduction of the moisture in the connector when the electronic device is in the power-off state.

The CC pin 617 may be used as a second pin for identifying the external electronic device inserted into the connector and sensing the wet state of the connector in the first state where one or more functions executable by connection with the external electronic device are activated.

According to an embodiment, the SBU pin 621 is used as the first pin for the connector of the USB type-C, but a latch pin may be used as the first pin and another pin may also be used as the first pin by applying a switch therein.

According to an embodiment, the power supply unit 440 supplies power to an element included in the electronic device under control of the processor 410.

According to an embodiment, the display 450 displays information indicating sensing of moisture if moisture in the connector is sensed in the first state where no moisture is sensed in the connector, and displays information indicating a charging alert if the external electronic device for charging is inserted in the second state where the moisture in the connector is sensed.

According to an embodiment, an electronic device includes a display, a connector, and a processor, in which the processor is configured to sense moisture introduced into a connector of the electronic device in a state where one or more functions executable by connection with an external electronic device are activated, to deactivate the one or more functions based on the sensing, to determine whether the introduced moisture is removed in a state where the one or more functions are deactivated, and to activate the one or more functions if the moisture is removed.

The processor may be configured to supply electric current to at least one pin included in the connector and to sense introduction of moisture in the connector by using at least one pin to which the electric current is supplied.

The processor may be configured to supply electric current to at least one pin included in the connector and to determine through at least one pin whether the moisture introduced into the connector is removed.

According to an embodiment, the electronic device may include the display 450, the connector 430, and the processor 410, in which the processor 410 is configured to switch to the second state where the function of the connector 430 is deactivated, if sensing moisture in the connector 430 in the first state where the function of the connector 430 is activated, and to supply electric current to the first pin for sensing drying of the moisture in the second state.

According to an embodiment, the first state indicates the dry state where the moisture in the connector is removed, and the second state indicates the wet state of the connector.

According to an embodiment, the processor 410 may be configured to activate the function of the connector by supplying pins of the connector in the first state and to deactivate the function of the connector by blocking supply of the electric current to the other pins of the connector except for the first pin in the second state.

According to an embodiment, the processor 410 may be configured to check for the wet state of the connector after the elapse of a specific time if sensing the dry state of the connector in the second state, and to switch to the first state if sensing the dry state of the connector based on a result of checking for the wet state.

According to an embodiment, the processor 410 may be configured to check for the wet state of the connector after the elapse of a specific time if detecting an external electronic device while sensing the dry state of the connector in the second state, or to display alert information through the display, and to check for the wet state after the elapse of a specific time if insertion of the external electronic device is released, and to maintain the second state if determining the wet state of the connector and to switch to the first state if determining the dry state of the connector, based on a result of checking for the wet state.

According to an embodiment, the processor 410 may be configured to check the wet state of the connector by using the first pin while performing the charging function with the connected first external electronic device for charging, if the first external electronic device for charging, which does not control the first pin, is inserted in the electronic device in the power-off state.

According to an embodiment, the processor 410 may be configured to check for the wet state of the connector using the first pin before the external electronic device for charging controls the first pin, by setting up communication with the second pin for sensing insertion of the external electronic device, if the second external electronic device for charging which controls the first pin is inserted in the electronic device in the power-off state.

According to an embodiment, if powering off the electronic device is selected when the second external electronic device for charging is connected and the charging function is executed in the power-on state of the electronic device, then the processor 410 may be configured to perform at least one of releasing the control by the first pin or resetting the second pin before the electronic device is powered off According to an embodiment, the processor 410 may be configured to detect the type of the foreign substance by using the first pin if detecting the foreign substance in the connector in the first state, to be connected with the external electronic device and to perform a corresponding function if sensing that the type of the foreign substance is the external electronic device, to detect the type of the foreign substance by using the second pin for sensing insertion of the external electronic device if sensing that the type of the foreign substance is not the external electronic device, and to switch to the second state if sensing that the type of the foreign substance is moisture, based on the detection result of the second pin.

Figure 7:
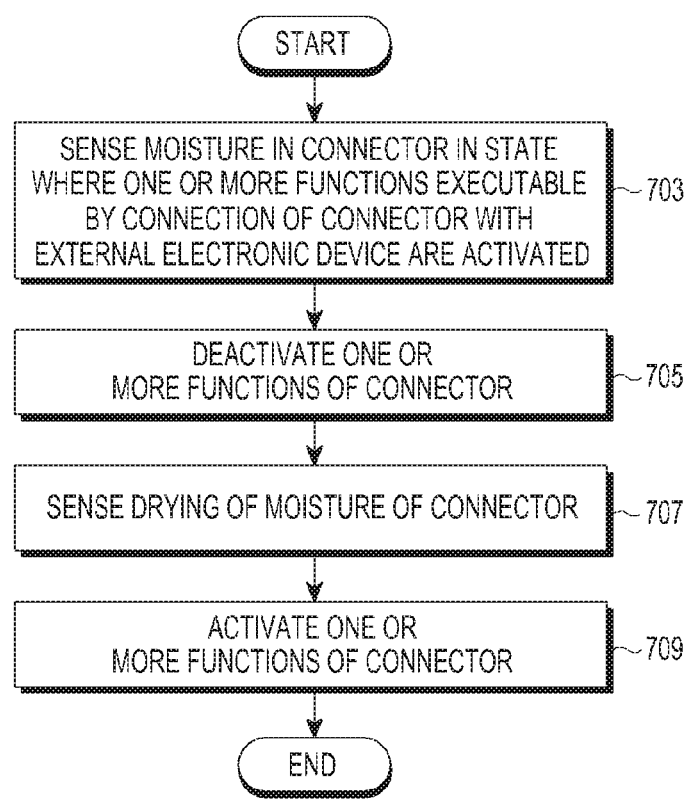
FIG. 7 is a flowchart illustrating a first operation capable of sensing moisture in an electronic device, according to an embodiment.

FIG. 7 is a flowchart illustrating a first operation capable of sensing moisture in an electronic device, according to an embodiment.

Referring to FIG. 7, the electronic device may include the entire electronic device 101 or a part thereof, or the entire electronic device 201 or 401 or a part thereof In step 703, the electronic device senses the introduction of moisture in the connector, based on a voltage value received from at least one pin (e.g., the second pin) of the connector in the first state (e.g., the dry state) where the function of the connector is activated.

In step 705, the electronic device switches to the second state (e.g., wet state) where a function of connection of the connector to the external electronic device is deactivated, based on sensing of the introduction of the moisture in the connector.

In step 707, the electronic device supplies electric current to at least one pin (e.g., the first pin) of the connector in the second state and senses the dry state where moisture introduced into the connector is removed, based on a state value measured from the at least one pin (e.g., the first pin).

In step 709, the electronic device switches to the first state where the function of the connector is activated, if sensing the dry state of the connector by using at least one pin (e.g., the first pin) of the connector.

Figure 8:
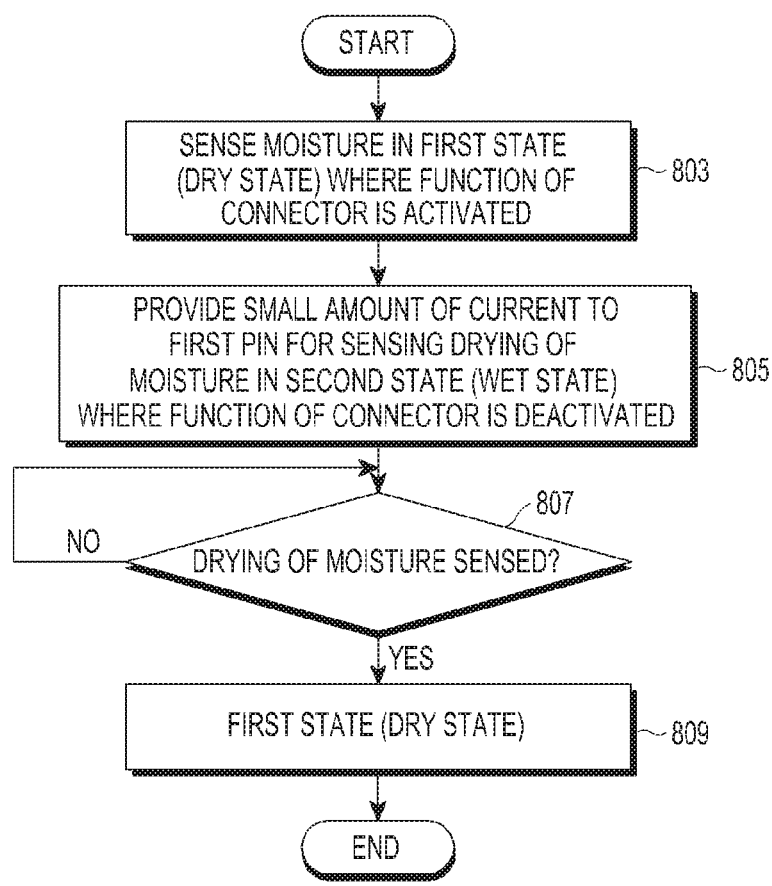
FIG. 8 is a flowchart illustrating a second operation capable of sensing moisture in an electronic device, according to an embodiment.

FIG. 8 is a flowchart illustrating a first operation capable of sensing moisture in an electronic device, according to an embodiment.

Referring to FIG. 8, the electronic device may include the entire electronic device 101 or a part thereof, or the entire electronic device 201 or 401 or a part thereof In step 803, the processor senses moisture introduced into the connector of the electronic device by using the second pin (e.g., the CC pin) in the first state (e.g., dry state) where the function of the connector of the electronic device is activated.

The processor supplies electric current to the plurality of pins included in the connector to activate the function of connection of the connector with the external electronic device in the first state where the connector is in the dry state.

The connector interface unit senses insertion of the external electronic device, and senses based on a voltage value received from the second pin (e.g., the CC pin) for sensing the wet state of the connector whether the external electronic device is inserted into the connector or the moisture is introduced into the connector, in the first state. The connector interface unit senses that the moisture is introduced in the connector, if the voltage value received from the second pin is a voltage value other than a voltage value for identifying the type of the external electronic device, and is greater than or equal to a preset threshold value.

The connector interface unit transmits the second state value to the processor, if sensing based on the voltage value received from the second pin that the moisture is introduced into the connector.

The processor senses the introduction of the moisture in the connector based on the second state value received from the connector interface unit.

In step 805, the processor switches to the second state (e.g., wet state) where the function of the connector is deactivated, if sensing the introduction of the moisture in the connector.

In the second state where the introduction of the moisture in the connector is sensed, the processor blocks supply of electric current to the other pins of the plurality of pins of the connector except for the first pin, and supplies a small amount of electric current to the first pin to prevent corrosion of the connector while sensing the dry state of the connector.

The processor controls the connector interface unit to allow the first pin to sense the dry state of the connector at predetermined intervals, blocks supply of electric current in the first period where the dry state is not sensed in the predetermined interval, and supplies the electric current in the second period for sensing the dry state in the predetermined interval to sense the dry state of the connector, thus preventing corrosion of the connector.

The processor supplies electric current in the on operation while repeating the on/off operations in the second period, thereby preventing corrosion of the connector while sensing the dry state of the connector.

In step 807, the processor senses the dry state in the second state.

The connector interface unit determines that the connector is in the dry state and transmits the first state information indicating the dry state of the connector to the processor, if measuring the high state value when setting the first pin to be high and measuring the low state value when setting the first pin to be low, in the second period for sensing the dry state by using the first pin (e.g., the SBU pin).

The connector interface unit determines that the connector is in the wet state and senses the dry state of the connector at predetermined intervals, if not measuring the high state value when setting the first pin to be high or not measuring the low state value when setting the first pin to be low, or if not measuring the high state value when setting the first pin to be high and not measuring the low state value when setting the first pin to be low.

In step 807, if drying of the moisture is not sensed, step 807 is repeated.

The processor senses that the connector is in the dry state, if receiving the first state information from the connector interface unit 420.

In step 809, the processor determines that the connector is in the dry state, switches to the first state (e.g., dry state), and supplies electric current to the plurality of pins of the connector to activate the function of the connector.

Figure 9:
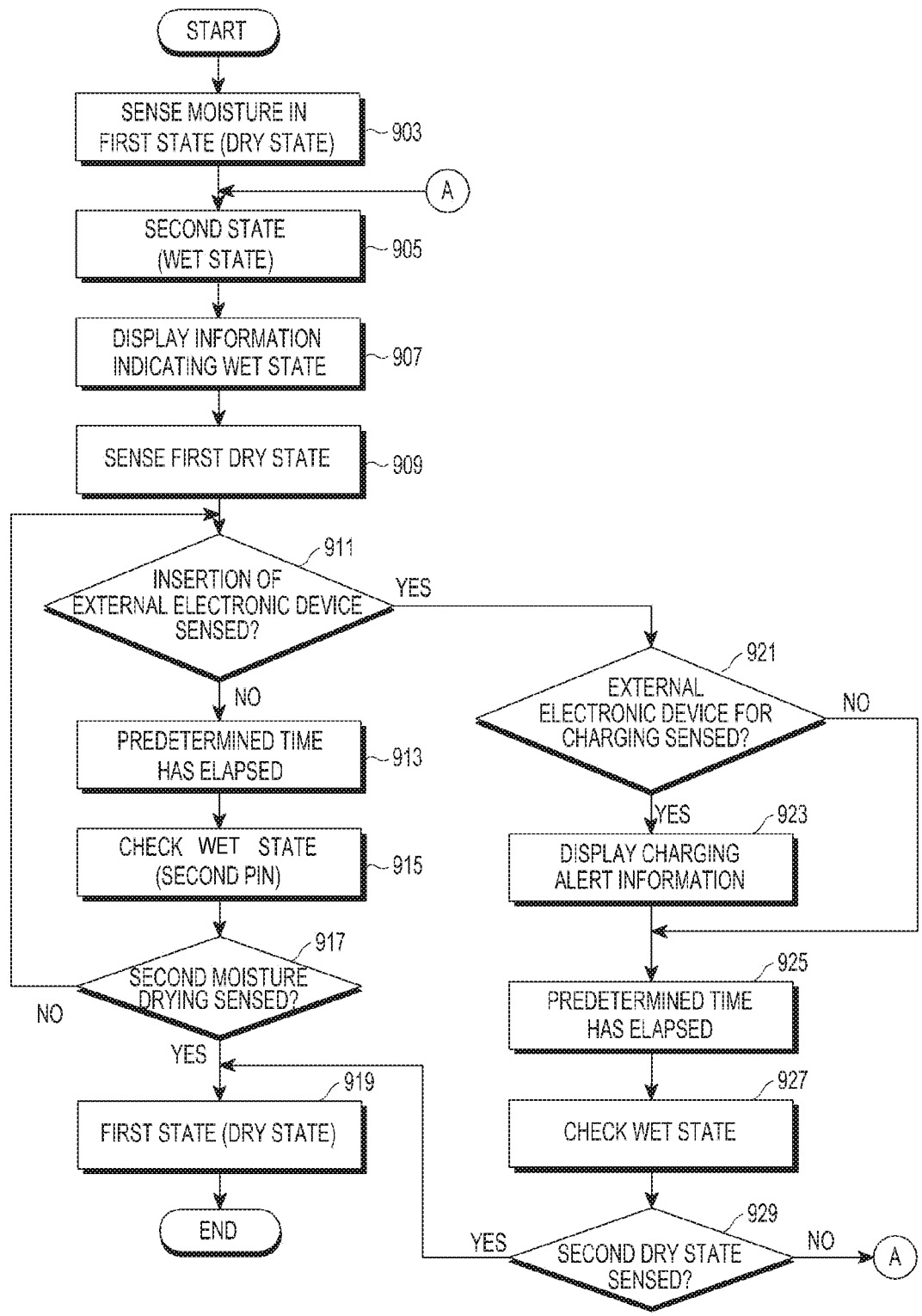
FIG. 9 is a flowchart illustrating an operation of sensing moisture when an external electronic device is inserted into an electronic device, according to an embodiment.

FIG. 9 is a flowchart illustrating an operation of sensing moisture when an external electronic device is inserted into an electronic device, according to an embodiment.

Referring to FIG. 9, the electronic device may include the entire electronic device 101 or a part thereof, or the entire electronic device 201 or 401 or a part thereof In step 903, the processor 120 senses the introduction of moisture in the connector in the first state (e.g., dry state) where the function of connection of the connector with the external electronic device is activated. The processor supplies electric current to the plurality of pins included in the connector to activate the function of connection of the connector with the external electronic device in the first state where the connector is in the dry state having no moisture therein.

The connector interface unit senses whether the external electronic device is inserted into the connector or moisture is introduced in the connector, based on a voltage value received from the second pin (e.g., the CC pin) for checking insertion of the external electronic device and the wet state of the connector in the first state.

The connector interface unit transmits the second state value to the processor, if sensing based on the voltage value received from the second pin that the moisture is introduced in the connector.

The processor senses the introduction of the moisture in the connector based on the second state value received from the connector interface unit 420.

In step 905, the processor senses the introduction of the moisture in the connector and switches to the second state (e.g., wet state) where the function of connection of the connector with the external electronic device is deactivated, if receiving the second state value.

In the second state where the introduction of the moisture in the connector is sensed, the processor blocks supply of electric current to the other pins of the plurality of pins of the connector except for the first pin (e.g., the SBU pin), and supplies a small amount of electric current to the first pin to prevent corrosion of the connector while sensing the dry state of the connector.

The processor controls the first pin to sense the dry state of the connector at predetermined intervals, blocks supply of electric current in the first period where the dry state is not sensed in the predetermined interval, and supplies electric current in the second period for sensing the dry state in the predetermined interval to sense the dry state of the connector, thus preventing corrosion of the connector.

The processor supplies electric current in the on operation while repeating the on/off operations in the second period, thereby preventing corrosion of the connector while sensing the dry state of the connector.

In step 907, after switching to the second state, the processor displays information indicating that the electronic device is in the wet state on the display.

In step 909, the processor senses the dry state of the connector in the second state.

The connector interface unit determines a first dry state of the connector if measuring a high state value when setting the first pin to be high and measuring a low state value when setting the first pin to be low in the second period for sensing the dry state by using the first pin.

The connector interface unit transmits information indicating the first dry state to the processor if sensing the first dry state of the connector in the second state.

In step 911, if sensing the dry state of the connector in the second state, the processor determines whether the external electronic device is inserted into the connector while maintaining the second state.

The processor supplies electric current to the second pin among the plurality of pins of the connector upon receiving information indicating the first dry state, and the connector interface unit determines whether the external electronic device is inserted into the connector based on the voltage value received from the second pin.

If determining based on the voltage value received from the second pin that the external electronic device is not inserted into the connector, the connector interface unit transmits information indicating that the external electronic device is not inserted into the connector to the processor.

The processor checks if a predetermined time has elapsed in step 913, if sensing that the external electronic device is not inserted into the connector.

In step 915, the processor checks for the wet state of the connector after the elapse of the predetermined time.

After the elapse of the predetermined time, the connector interface unit checks for the wet state of the connector based on the state value measured from the first pin or the voltage value received from the second pin, and transmits a result of checking for the wet state to the processor.

In step 917, the processor checks the wet state of the connector. In step 917, if determining that the connector is in the wet state, the processor performs step 911.

If sensing the wet state of the connector based on the voltage value received from the second pin, the connector interface unit transmits information indicating the wet state of the connector to the processor. In step 917, the processor switches to the first state that is the dry state of the connector in step 919, if determining that the connector is in a second moisture drying state. If sensing the second dry state of the connector as the result of checking for the wet state based on the state value measured from the first pin or the voltage value received from the second pin, the connector transmits the first state information indicating the dry state of the connector to the processor.

If in step 911, the processor determines based on the voltage value received from the second pin that the external electronic device is inserted into the connector, the connector interface unit transmits information indicating that the external electronic device is inserted into the connector to the processor and step 921 is performed.

The connector interface unit transmits the third state information for maintaining the second state to the processor, if sensing the insertion of the external electronic device into the connector based on the voltage value received from the second pin.

In step 921, the processor determines if an external electronic device for charging is sensed. The processor displays charging alert information and blocks charging in step 923 if sensing that the type of the external electronic device inserted into the connector is an external electronic device for charging.

The connector interface unit transmits information indicating the insertion of the external electronic device for charging to the processor, if the external electronic device inserted into the connector includes the third pin (e.g., the $V_{BUS}$ pin) for supplying power.

The processor checks if a predetermined time has elapsed in step 925, and checks for the wet state in step 927 if the predetermined time has elapsed.

Alternatively, if receiving the third state information from the connector interface unit and not blocking the supply of electric current to the second pin among the plurality of pins of the connector, the processor senses release of the insertion of the external electronic device for charging by using the second pin. If sensing the release of the insertion of the external electronic device for charging, the processor checks the wet state in step 927.

If determining the type of the external electronic device inserted into the connector is not an external electronic device for charging in step 921, the processor checks if the predetermined time has elapsed in step 925, and checks the wet state in step 927 if the predetermined time has elapsed.

In step 927, the processor checks the wet state of the connector.

The connector interface unit checks for the wet state of the connector based on the state value measured from the first pin or the voltage value received from the second pin, and transmits the result of checking for the wet state to the processor.

In step 929, the processor senses the second dry state of the connector. If determining that the connector is in the dry state in step 929, the processor 120 performs step 919 of switching to the first state. If determining that the connector is not in the dry state in step 929, the processor performs step 905.

If sensing the wet state of the connector measured from the first pin or the voltage value received from the second pin, the connector interface unit transmits information indicating the wet state of the connector to the processor.

In step 919, the processor switches to the first state, if determining that the connector is in the dry state.

If sensing the second dry state of the connector from the first pin or the voltage value received from the second pin, the connector transmits the first state information indicating the dry state of the connector to the processor.

Figure 10:
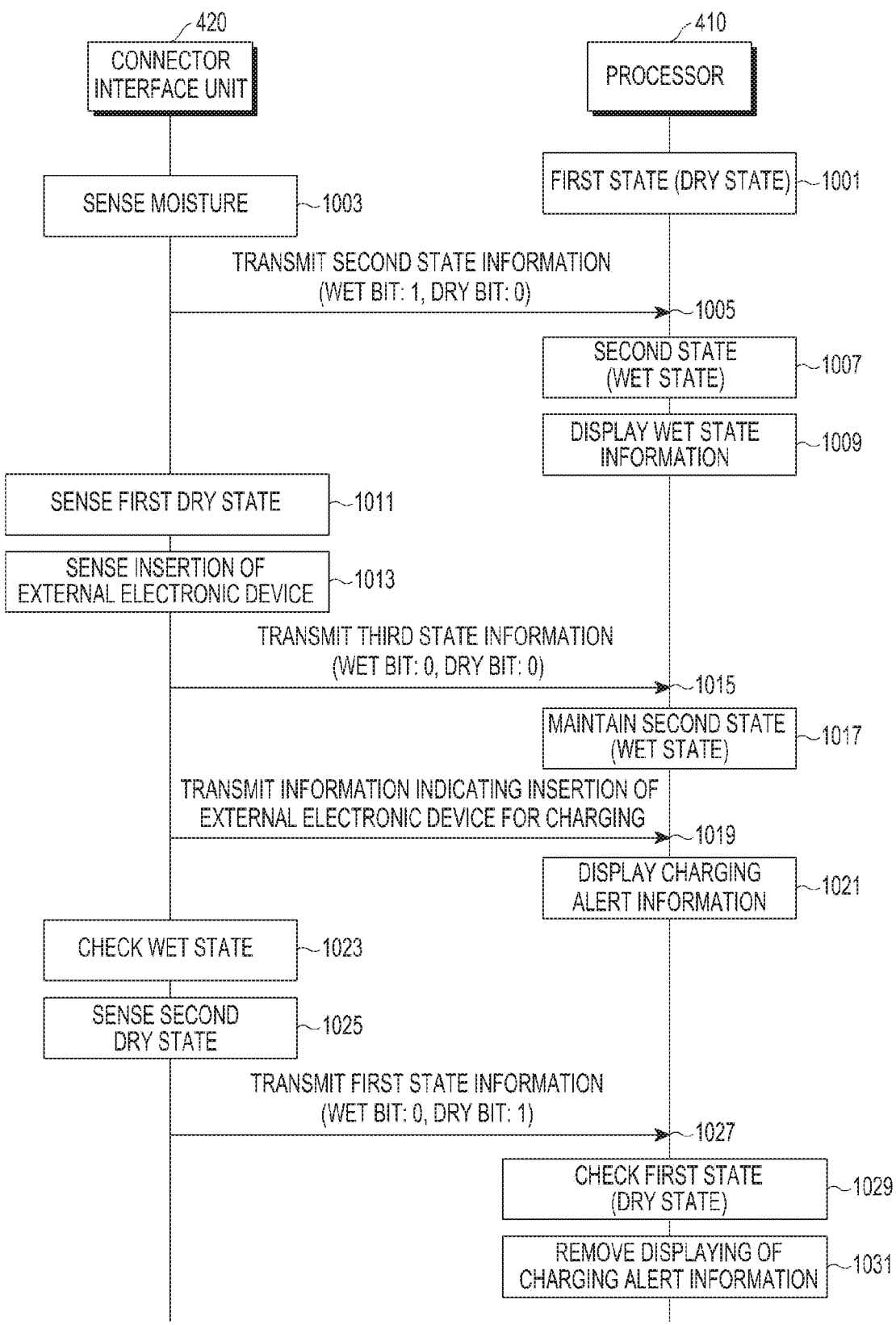
FIG. 10 is a diagram illustrating an operation of indicating a moist state (or a wet state) when an external electronic device is inserted into an electronic device, according to an embodiment.

FIG. 10 is a diagram illustrating an operation of indicating a moist state (or a wet state) when an external electronic device is inserted into an electronic device, according to an embodiment.

Referring to FIG. 10, the electronic device may include the entire electronic device 101 or a part thereof, or the entire electronic device 201 or 401 or a part thereof In step 1001, the processor senses the introduction of moisture in the connector of the electronic device in the first state where no moisture is introduced into the connector and a function of the connection of the connector with the external electronic device is activated.

In step 1003, the connector interface unit senses the moisture introduced in the connector based on the voltage value received from the second pin.

In step 1005, the connector interface unit generates the second state information indicating introduction of moisture in the connector and transmits the second state information to the processor 410.

In step 1007, the processor senses the introduction of moisture in the connector and switches to the second state (e.g., wet state) where the function of connection of the connector with the external electronic device is deactivated, if receiving the second state information.

In step 1009, the processor displays the wet state information indicating the introduction of the moisture in the connector, while switching to the second state.

In step 1011, the connector interface unit determines the first dry state of the connector if measuring the high state value when setting the first pin to be high and measuring the low state value when setting the first pin to be low in the second state by using the first pin to which a small amount of electric current is supplied.

In step 1013, the connector interface unit senses insertion of the external electronic device into the connector based on the voltage value received from the second pin to which the electric current is supplied as sensing the first dry state of the connector.

In step 1015, the connector interface unit generates the third state information indicating the insertion of the external electronic device into the connector in the wet state of the connector and transmits the third state information to the processor.

In step 1017, the processor determines the occurrence of an event due to an external factor in the second state where the moisture is sensed, and maintains the second state, if receiving the third state information.

In step 1019, if determining based on the voltage value received from the second pin that the external electronic device for charging is inserted into the connector, the connector interface unit transmits information indicating that the external electronic device for charging is inserted into the connector to the processor.

In step 1021, once receiving the information indicating that the external electronic device for charging is inserted into the connector, the processor displays information indicating the charging alert on the display.

In step 1023, the connector interface unit checks for the wet state of the connector through the second pin if the insertion of the external electronic device is released or a predetermined time has elapsed.

In step 1025, the connector interface unit checks for the wet state of the connector based on the state value measured from the first pin or the voltage value received from the second pin, and senses the second dry state of the connector.

In step 1027, the connector interface unit transmits the first state information indicating the dry state of the connector to the processor, as sensing the second dry state of the connector.

In step 1029, the processor switches to the first state where the connector is in the dry state, if receiving the first state information.

In step 1031, the processor removes the information indicating the charging alert upon switching to the first state.

Figure 11A:
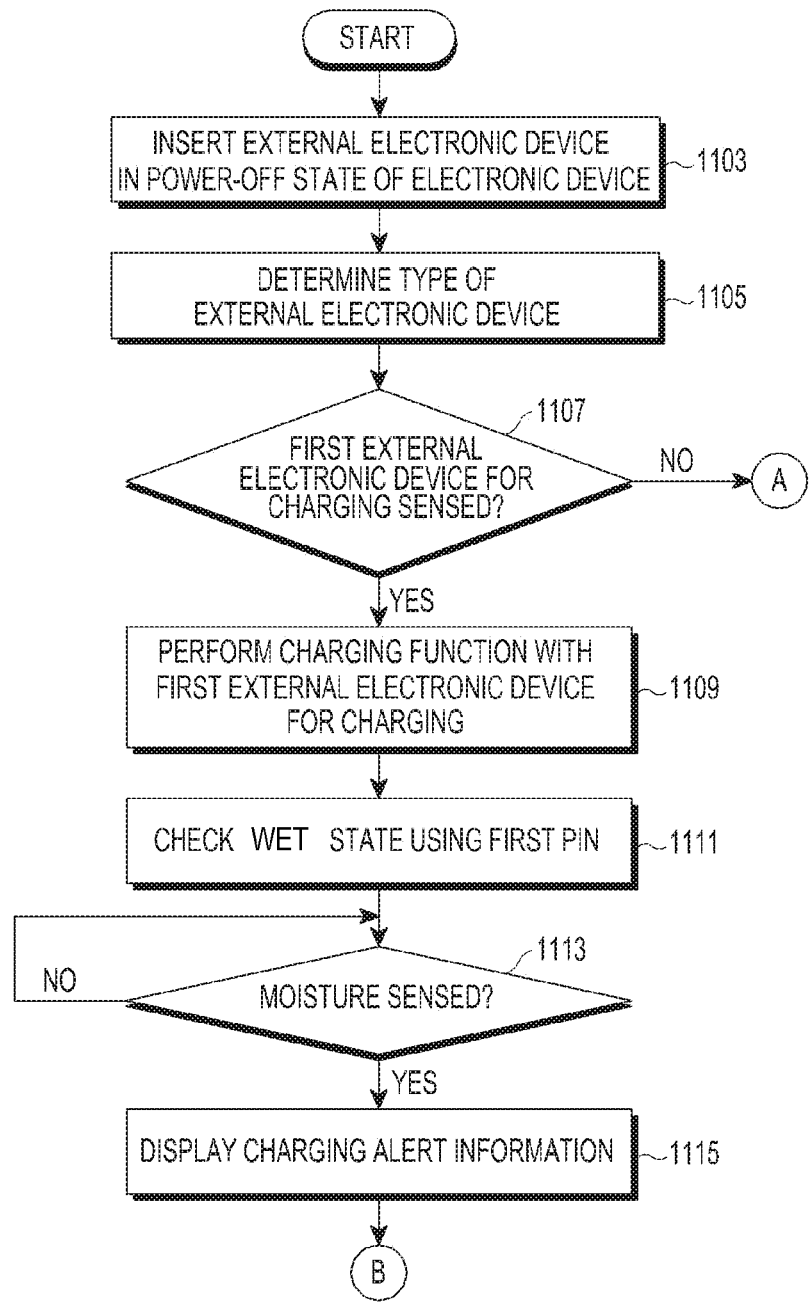
FIGS. 11A and 11B are flowcharts illustrating an operation of sensing moisture in a power-off state of an electronic device, according to an embodiment.
Figure 11B:
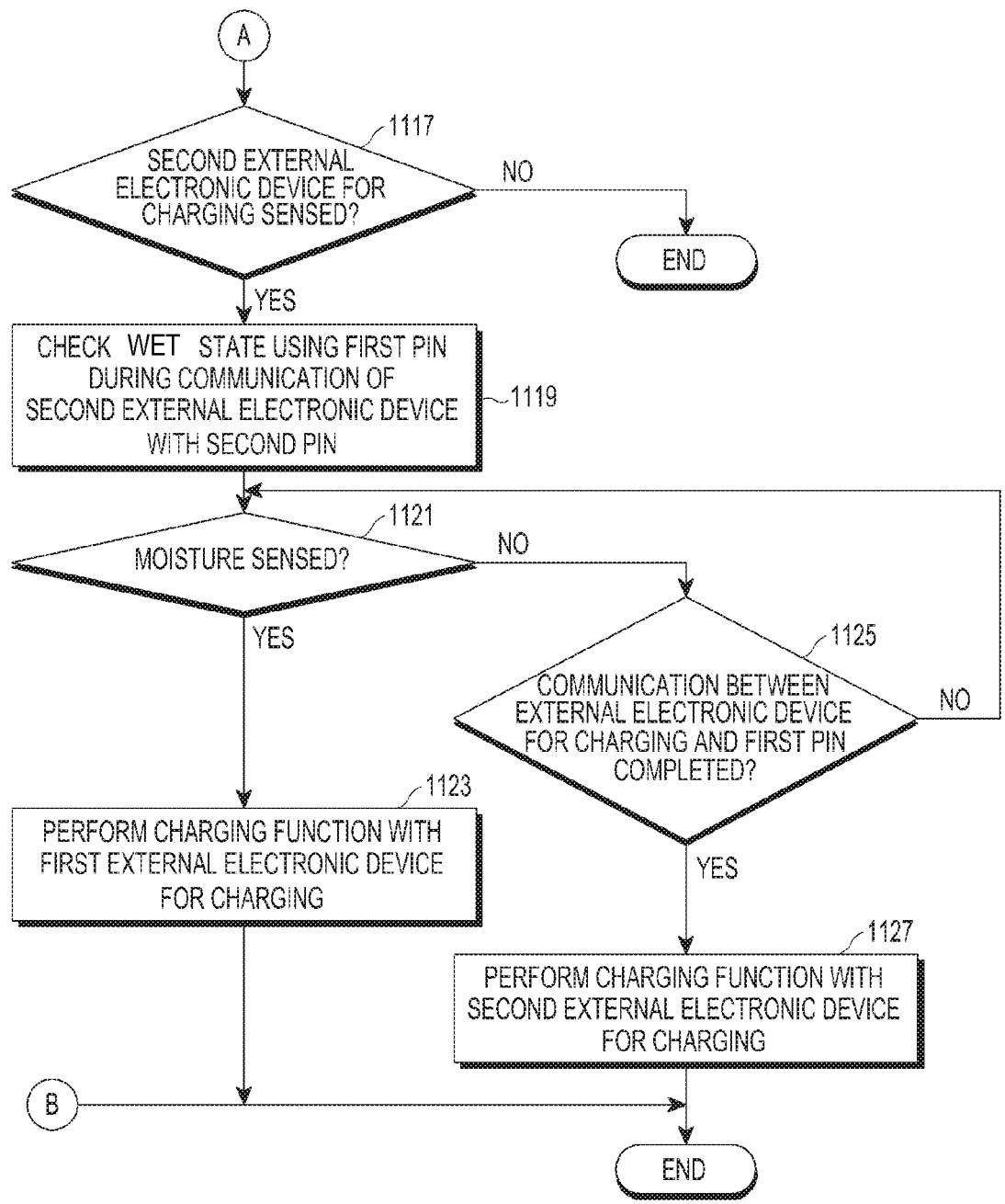

FIGS. 11A and 11B are flowcharts illustrating an operation of sensing moisture in a power-off state of an electronic device, according to an embodiment.

Referring to FIG. 11A, the electronic device may include the entire electronic device 101 or a part thereof, or the entire electronic device 201 or 401 or a part thereof In step 1103, when the electronic device is in the power-off state, the external electronic device is inserted into the connector of the electronic device.

In step 1105, the electronic device is powered on based on insertion of the connector, and supplies electric current to the first pin capable of sensing moisture in the connector and the second pin capable of sensing insertion of the external electronic device. The electronic device determines the type of the external electronic device.

In step 1107, the electronic device senses if a first external electronic device is for charging.

To sense the external electronic device, the electronic device may make a determination based on a voltage value of the second pin. For example, the electronic device senses the external electronic device is the external electronic device if the voltage value received from the second pin is matched to the voltage value of the first external electronic device for charging, which does not control the first pin, and performs a charging function with the first external electronic device. If the first external device for charging is sensed, then the electronic device performs step 1109. If sensing insertion of the first external electronic device for charging into the connector, the electronic device checks for the wet state of the connector by using the first pin, and performs the charging function with the first external electronic device if the connector is in the dry state. If sensing the wet state of the connector by using the first pin, the electronic device displays charging alert information and blocks the charging function with the first external electronic device for charging. If the first external device for charging is not sensed, then the electronic device performs step 1117.

In step 1111, the electronic device checks for the wet state of the connector by using the first pin, while performing the charging function with the first external electronic device. For example, if the voltage value received from the first pin is a voltage value other than a voltage value corresponding to a type of the external electronic device and the voltage value received from the first pin is greater than or equal to a preset threshold value, the electronic device senses that moisture is introduced into the connector.

In step 1113, moisture is sensed in the connector. If sensing the introduction of the moisture into the connector is a result of checking for the wet state by using the first pin in step 1113, the electronic device displays information indicating the charging alert on the display in step 1115.

Referring to FIG. 11B, if sensing based on the voltage value of the second pin that the external electronic device inserted into the connector is the second external electronic device for charging in step 1117, which controls the first pin the electronic device checks the wet state of the connector by using the first pin before the second external electronic device for charging performs communication (e.g., VDM communication) with the second pin, in step 1119. If receiving a VDM from the second external electronic device for charging, the electronic device recognizes that the second external electronic device for charging is in the DP Alt mode, and controls the second external electronic device and use the first pin (e.g., the SBU pin), thereby checking for the wet state of the connector by using the first pin before the first external electronic device for charging controls the first pin.

In step 1121, moisture is sensed by the electronic device. The electronic device may check for the wet state of the connector based on the state value measured from the first pin. If moisture is sensed, in step 1123 the electronic device performs a charging function with the first external electronic device. The electronic device may display information indicating a charging alert.

If in step 1121 moisture is not sensed, in step 1125 the electronic device determines if communication between the external electronic device for charging and the first pin is completed. If the communication is competed, in step 1127 the electronic device performs a charging function with the second external electronic device. If the communication is not completed, the electronic device repeats step 1121.

Figure 12:
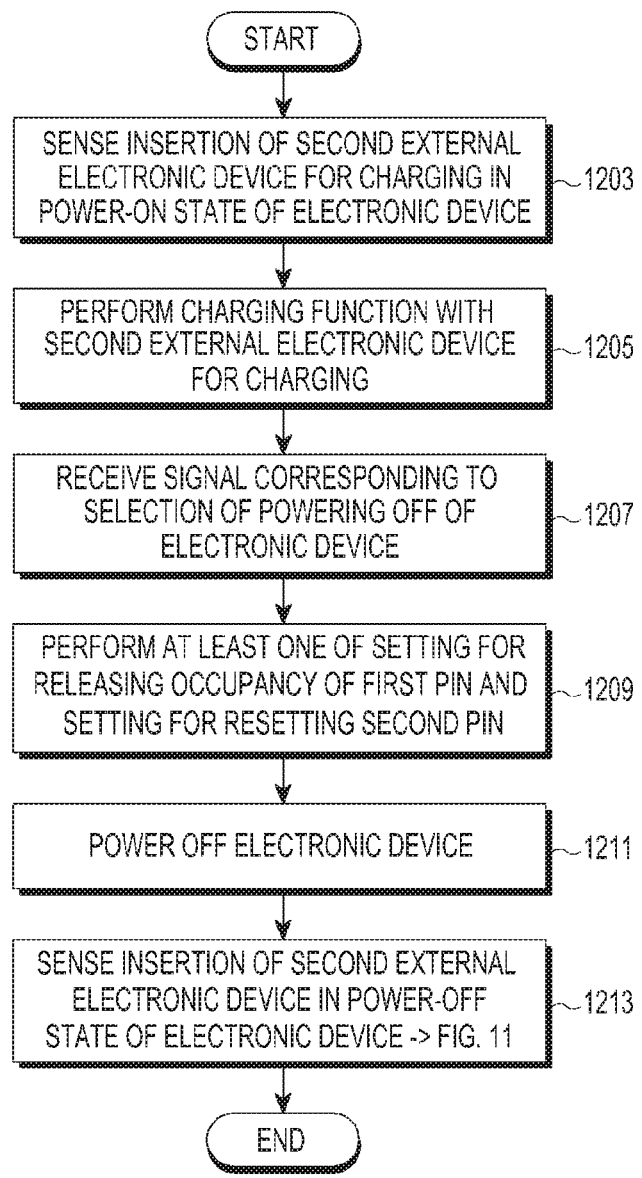
FIG. 12 is a flowchart illustrating an operation of sensing moisture when an external electronic device for charging is inserted into an electronic device, according to an embodiment.

FIG. 12 is a flowchart illustrating an operation of sensing moisture when an external electronic device for charging is inserted into an electronic device, according to an embodiment.

Referring to FIG. 12, the electronic device may include the entire electronic device 101 or a part thereof, or the entire electronic device 201 or 401 or a part thereof In step 1203, the electronic device in the power-on state senses insertion of the second external electronic device into the connector of the electronic device. The electronic device is powered on based on the insertion of the connector, and supplies electric current to the first pin capable of sensing moisture in the connector and the second pin capable of sensing insertion of the external electronic device.

The electronic device senses the external electronic device as the second external electronic device for charging if the voltage value received from the second pin is matched to the voltage value of the second external electronic device for charging, which controls the first pin, in step 1203 and performs a charging function with the second external electronic device for charging in step 1205.

In step 1207, the powering off of the electronic device is selected by the user during the charging function with the second external electronic device for charging, and a signal corresponding to the selection of powering off is received.

In step 1209, the electronic device performs at least one of releasing control of the first pin and resetting the second pin from when the signal corresponding to the selection of powering off is received before the electronic device is powered off As the processor performs at least one of releasing the control by the first pin or resetting the second pin before the electronic device is powered off, it is possible to prevent the first pin from erroneously sensing that the moisture is introduced into the connector because the second external electronic device for charging in the power-off state of the electronic device controls the first pin.

In step 1211, the electronic device is powered off in a state where the second external electronic device for charging is inserted into the connector of the electronic device.

In step 1213, if the electronic device is powered off, the electronic device recognizes that the second external electronic device for charging has been inserted in a electronic device in the power-off state, as the electronic device performs at least one of releasing control of the first pin and resetting the second pin. As the processor recognizes the power-off state of the electronic device in the state where the second external electronic device for charging is connected when the insertion of the second external electronic device for charging in the power-off state of the electronic device, the processor performs steps 1103 and 1107, and steps 1117 through 1127.

Figure 13:
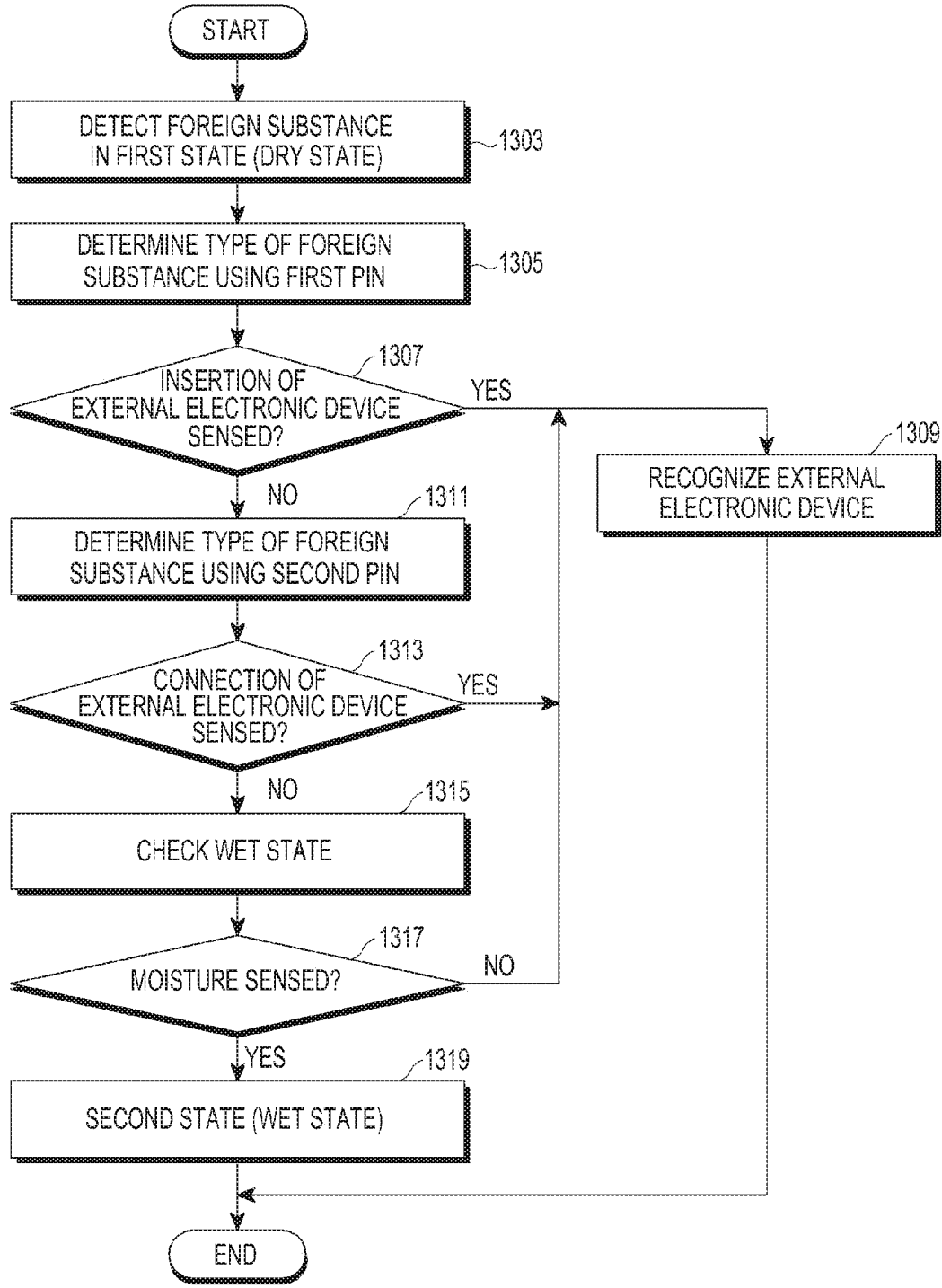
FIG. 13 is a flowchart illustrating an operation of sensing an external electronic device by an electronic device, according to an embodiment.

FIG. 13 is a flowchart illustrating an operation of sensing an external electronic device by an electronic device, according to an embodiment. Referring to FIG. 13, the electronic device may include the entire electronic device 101 or a part thereof, or the entire electronic device 201 or 401 or a part thereof In step 1303, the electronic device detects a foreign substance in the connector in the first state that is the dry state where no moisture is introduced into the connector.

In step 1305, the electronic device determines the type of the foreign substance detected in the connector by using the first pin having a higher recognition speed than the second pin.

In step 1305, the electronic device may determine the type of the foreign substance by using at least one pin of the connector. The electronic device may sense the foreign substance by setting at least one pin to a high value and a low value, and checking measured values corresponding to the set values. For example, the electronic device may determine the insertion of the external electronic device instead of the introduction of the moisture into the connector, if measuring the high state value when setting the first pin to be high and measuring the low state value when setting the first pin to be low. For example, the electronic device may not detect the foreign substance in the connector as the external electronic device and instead, as the introduction of the moisture, if not measuring the high state value when setting the first pin to be high or not measuring the low state value when setting the first pin to be low, or if not measuring the high state value when setting the first pin to be high and not measuring the low state value when setting the first pin to be low.

In step 1307, the electronic device determines if insertion of the external electronic device is sensed. If in step 1307 it is determined based on the state value measured from the first pin that the type of the foreign substance is the external electronic device, in step 1309 the external electronic device is recognized.

If it is determined based on the state value measured from the first pin that the type of the foreign substance is not the external electronic device in step 1307, then the electronic device determines the type of the foreign substance by using the voltage value received from the second pin having the accurate recognition rate in step 1311.

If it is determined based on the voltage value received from the second pin that the type of the foreign substance is the external electronic device in step 1313, then the electronic device is connected with the external electronic device and performs a corresponding function in step 1309.

If it is determined based on the voltage value received from the second pin that the type of the foreign substance is not the external electronic device in step 1313, then the electronic device checks for the wet state of the connector in step 1315.

If sensing the introduction of moisture into the connector, based on the voltage value received from the second pin in step 1317, the electronic device switches to the second state for indicating the wet state where the moisture is introduced into the connector in step 1319. If not sensing the introduction of moisture in the connector, based on the voltage value received from the second pin in step 1317, step 1307 is performed.

According to an embodiment, a method for sensing moisture in an electronic device includes sensing moisture introduced into a connector of the electronic device in a state where one or more functions executable by connection of the connector with an external electronic device are activated, deactivating the one or more functions based on the sensing, determining whether the introduced moisture is removed in a state where the one or more functions are deactivated, and activating the one or more functions if the moisture is removed.

According to an embodiment, sensing the moisture may include supplying electric current to at least one pin included in the connector and sensing introduction of the moisture in the connector by using the at least one pin to which the electric current is supplied.

According to an embodiment, determining whether the moisture is removed may include supplying electric current to at least one pin included in the connector and sensing drying of the moisture introduced to the connector by using the at least one pin.

According to an embodiment, a method for sensing moisture in an electronic device includes switching from a first state where a function of a connector of the electronic device is activated to a second state where the function of the connector is deactivated, if sensing moisture in the connector, and supplying electric current to a first pin for sensing drying of moisture in the second state.

According to an embodiment, the first state indicates the dry state where the moisture in the connector is removed, and the second state indicates the wet state of the connector.

According to an embodiment, the method may further include activating the function of the connector by supplying pins of the connector in the first state and deactivating the function of the connector by blocking supply of the electric current to the other pins of the connector except for the first pin in the second state.

According to an embodiment, the method may further include sensing using the first pin at predetermined intervals in the second state whether the connector is in the dry state, blocking supply of the electric current in a first period where the dry state is not sensed, and supplying the electric current in a second period where the dry state is sensed.

According to an embodiment, the method may further include checking the wet state of the connector after the elapse of a specific time if sensing the dry state of the connector in the second state, and switching to the first state if sensing the dry state of the connector based on a result of checking the wet state.

According to an embodiment, the method may further include checking for the wet state of the connector after an elapse of a predetermined time if detecting an external electronic device while sensing the dry state of the connector in the second state, maintaining the second state if sensing moisture in the connector based on the result of checking the wet state, and switching to the first state if sensing the dry state of the connector based on the result of checking the wet state.

According to an embodiment, the method may further include checking for wet state of the connector by using the first pin while being connected with a first external electronic device for charging and performing a charging function with the connected first external electronic device for charging, if the first external electronic device for charging which does not control the first pin is inserted the electronic device in in a power-off state.

According to an embodiment, the method may further include checking for the wet state of the connector by using the first pin before a second external electronic device for charging controls the first pin, by setting up communication with a second pin for sensing insertion of the second external electronic device for charging, if the second external electronic device for charging, which controls the first pin, is inserted in the electronic device in power-off state.

According to an embodiment, the method may further include performing at least one of releasing control by the first pin or resetting the second pin before the electronic device is powered off, if the powering off of the electronic device is selected when the second external electronic device for charging, which controls the first pin, is connected and a charging function is executed.

According to an embodiment, the method may further include detecting the type of the foreign substance by using the first pin if detecting the foreign substance in the connector in the first state, being connected with the external electronic device and performing a corresponding function if detecting that the type of the foreign substance is an external electronic device, detecting the type of the foreign substance by using the second pin for sensing insertion of the external electronic device, if detecting that the type of the foreign substance is not the external electronic device, and switching to the second state if detecting that the type of the foreign substance is moisture, based on a result of the detecting of the second pin.

According to an embodiment, a storage medium has recorded thereon a program for checking for a wet state of an electronic device, in which the program includes operations performed by the electronic device, the operations including switching from a first state where a function of a connector of the electronic device is activated to a second state where the function of the connector is deactivated, if sensing moisture in the connector, and supplying electric current to a first pin for sensing drying of moisture in the second state.

According to an embodiment, by blocking supply of electric current to a connector for sensing insertion of an external electronic device in a wet state, corrosion of the electronic device may be prevented.

According to an embodiment, it is possible to prevent erroneous sensing of the introduction of the moisture into the connector because the moisture introduced in the connector moves back as the external electronic device is connected to the electronic device in the wet state.

According to an embodiment, the moisture in the electronic device is sensed even in the power-off state of the electronic device, thereby preventing corrosion of the electronic device.

According to an embodiment, the external electronic device inserted into the electronic device may be recognized rapidly.

Various embodiments disclosed herein are provided merely to easily describe technical details of the present disclosure and to help the understanding of the present disclosure, and are not intended to limit the scope of the present disclosure. Accordingly, the scope of the present disclosure should be construed as including all modifications or various other embodiments based on the technical idea of the present disclosure as defined in the appended claims and their equivalents.

What is claimed is:

1. An electronic device comprising:
a display;
a connector including at least a first pin and a second pin; and
a processor configured to:
sense moisture introduced into the connector, by using the second pin of the connector for identifying an external electronic device, in a first state where one or more functions executable by connection of the connector with the external electronic device are activated;
deactivate the one or more functions if moisture is sensed in the connector;
determine whether the introduced moisture is removed by using the first pin of the connector, in a second state where the one or more functions are deactivated; and
activate the one or more functions if the moisture is removed from the connector.

2. The electronic device of claim 1, wherein the processor is further configured to:
supply electric current to the second pin included in the connector and to sense introduction of the moisture into the connector by using the second pin to which the electric current is supplied.

3. The electronic device of claim 1, wherein the processor is further configured to:
supply electric current to the first pin included in the connector and to determine through the first pin whether the moisture introduced into the connector is removed.

4. An electronic device comprising:
a display;
a connector including at least a first pin and a second pin; and
a processor configured to sense moisture introduced into the connector, by using the second pin of the connector for identifying an external electronic device, in a first state where one or more functions executable by connection of the connector with the external electronic device are activated, and
switch to a second state where a function of the connector is deactivated if sensing moisture in the connector in the first state where the function of the connector is activated, and to supply electric current to the first pin for sensing moisture drying in the second state.

5. The electronic device of claim 4, wherein the first state indicates a dry state where the moisture in the connector is removed, and the second state indicates a wet state of the connector, and
wherein the processor is further configured to:
activate the function of the connector by supplying electric current to at least the second pin of the connector in the first state and to deactivate the function of the connector by blocking supply of the electric current to at least the second pin except for the first pin among pins of the connector in the second state.

6. The electronic device of claim 4, wherein the processor is further configured to:
sense whether the connector is in the dry state using the first pin at predetermined intervals in the second state;
block supply of the electric current in a first period where the dry state is not sensed;
supply the electric current in a second period where the dry state is sensed;
check a wet state of the connector after an elapse of a predetermined time if sensing a dry state of the connector in the second state; and switch to the first state if sensing the dry state of the connector based on a result of checking the wet state.

7. The electronic device of claim 4, wherein the processor is further configured to:
check a wet state of the connector after an elapse of a predetermined time if detecting an external electronic device while sensing a dry state of the connector in the second state, and maintain the second state if sensing moisture in the connector; and
switch to the first state if sensing moisture drying in the connector, based on the result of checking the wet state.

8. The electronic device of claim 4, wherein the processor is further configured to:
check a wet state of the connector by using the first pin while being connected with a first external electronic device for charging and performing a charging function with the connected first external electronic device for charging, if the first external electronic device for charging which does not control the first pin is inserted in a power-off state of the electronic device; and
check a wet state of the connector by using the first pin before a second external electronic device for charging controls the first pin, by setting up communication with the second pin for sensing insertion of the second external electronic device for charging, if the second external electronic device for charging, which controls the first pin, is inserted in a power-off state of the electronic device.

9. The electronic device of claim 4, wherein the processor is further configured to:
perform at least one of releasing control by the first pin or resetting the second pin before the electronic device is powered off, if the powering off of the electronic device is selected when the second external electronic device for charging, which controls the first pin, is connected and a charging function is executed.

10. The electronic device of claim 4, wherein the processor is further configured to:
detect a type of a foreign substance by using the first pin if detecting the foreign substance in the connector in the first state;
perform a corresponding function when connected with the external electronic device if detecting that the type of the foreign substance is an external electronic device;
detect a type of the foreign substance by using a second pin for sensing insertion of the external electronic device, if detecting that the type of the foreign substance is not the external electronic device; and
switch to the second state if detecting that the type of the foreign substance is moisture, based on a result of the detecting of the second pin.

11. A method for sensing moisture in an electronic device, the method comprising:
sensing, by using at least a second pin of a connector for identifying an external electronic device, moisture introduced into the connector of the electronic device in a state where one or more functions executable by connection of the connector with the external electronic device are activated;
deactivating the one or more functions if moisture is sensed in the connector;
determining, by using at least a first pin of the connector, whether the introduced moisture is removed in a state where the one or more functions are deactivated; and
activating the one or more functions if the moisture is removed.

12. The method of claim 11, wherein sensing the moisture comprises supplying electric current to at least the second pin included in the connector and sensing introduction of the moisture in the connector by using the at least the second pin to which the electric current is supplied.

13. The method of claim 11, wherein determining whether the moisture is removed comprises supplying electric current to at least the firs pin included in the connector and sensing drying of the moisture introduced to the connector by using at least the first pin.

14. A method for sensing moisture in an electronic device, the method comprising:
sensing moisture introduced into a connector, by using at least a second pin of the connector for identifying an external electronic device, in a first state where one or more functions executable by connection of the connector with the external electronic device are activated;
switching from the first state where a function of the connector of the electronic device is activated to a second state where the function of the connector is deactivated, if sensing moisture in the connector; and
supplying electric current to at least a first pin of the connector for sensing drying of moisture in the second state.

15. The method of claim 14, wherein the first state indicates a dry state where the moisture in the connector is removed, and the second state indicates a wet state of the connector, and further comprising:
activating the function of the connector by supplying electric current to at least the second pin of the connector in the first state; and
deactivating the function of the connector by blocking supply of the electric current to at least the second pin except for the first pin among the pins of the connector in the second state.

16. The method of claim 14, further comprising:
sensing whether the connector is in the dry state using the first pin at predetermined intervals in the second state, blocking supply of the electric current in a first period where the dry state is not sensed;
supplying the electric current in a second period where the dry state is sensed;
checking a wet state of the connector after an elapse of a predetermined time if detecting an external electronic device while sensing a dry state of the connector in the second state; and
switching to the first state if sensing the dry state of the connector based on the result of checking the wet state.

17. The method of claim 14, further comprising:
checking a wet state of the connector after an elapse of a predetermined time if detecting an external electronic device while sensing the dry state of the connector in the second state;
maintaining the second state if sensing moisture in the connector based on the result of checking the wet state; and
switching to the first state if sensing the dry state of the connector based on the result of checking the wet state.

18. The method of claim 14, further comprising:
checking a wet state of the connector by using the first pin while being connected with a first external electronic device for charging;
performing a charging function with the connected first external electronic device for charging, if the first external electronic device for charging which does not control the first pin is inserted in a power-off state of the electronic device; and checking a wet state of the connector by using the first pin before a second external electronic device for charging controls the first pin, by setting up communication with the second pin for sensing insertion of the second external electronic device for charging, if the second external electronic device for charging, which controls the first pin, is inserted in a power-off state of the electronic device.

19. The method of claim 14, further comprising:

performing at least one of releasing control by the first pin or resetting the second pin before the electronic device is powered off, if the powering off of the electronic device is selected when a second external electronic device for charging, which controls the first pin, is connected and a charging function is executed.

20. The method of claim 14, further comprising:

detecting a type of a foreign substance by using the first pin if detecting the foreign substance in the connector in the first state;

performing a corresponding function while connected with the external electronic device if detecting that the type of the foreign substance is an external electronic device;

detecting the type of the foreign substance by using a second pin for sensing insertion of the external electronic device, if detecting that the type of the foreign substance is not the external electronic device; and switching to the second state if detecting that the type of the foreign substance is moisture, based on a result of the detecting of the second pin.

* * * * *